United States Patent [19]
Nubson et al.

[11] Patent Number: 5,588,763
[45] Date of Patent: Dec. 31, 1996

[54] SYSTEM AND METHOD FOR CLEANING AND PRODUCING DATA BEARING CARDS

[75] Inventors: Richard C. Nubson, Eden Prairie; Glenn R. Carney, Eagan; Luc DeBleeckere, Crystal; Ronald B. Howes; Milo B. Squires, both of Minneapolis; David E. Wickstrom, St. Louis Park; Dennis J. Warwick, Richfield; Benjamin H. Sannel, St. Louis Park; Gretchen J. Moeller, Plymouth, all of Minn.; Paul R. Caron, Tiverton; Harold D. Schofield, Naragansett, both of R.I.

[73] Assignee: Datacard Corporation, Del.

[21] Appl. No.: 324,731

[22] Filed: Oct. 18, 1994

Related U.S. Application Data

[62] Division of Ser. No. 20,005, Feb. 17, 1993, Pat. No. 5,401,111, which is a continuation of Ser. No. 698,733, May 10, 1991, abandoned, which is a division of Ser. No. 249,338, Sep. 23, 1988, Pat. No. 5,037,216.

[51] Int. Cl.$^6$ ..................... B41J 29/17
[52] U.S. Cl. ..................... 400/700; 15/100
[58] Field of Search ..................... 400/700, 701, 400/702; 360/88, 97.02; 235/437, 438, 439, 449, 479, 475; 15/256.52, 100, 102

[56] References Cited

U.S. PATENT DOCUMENTS

| | | | |
|---|---|---|---|
| 2,919,129 | 12/1959 | Sjostrom | 271/33 |
| 3,382,130 | 5/1968 | Della Vite | 156/389 |
| 3,510,903 | 5/1970 | Stoever et al. | 15/256.5 |
| 3,800,349 | 4/1974 | Green | 15/4 |
| 3,857,560 | 12/1974 | Gundlach | 271/33 |
| 3,877,371 | 4/1975 | Jaffa | 101/425 |
| 4,006,507 | 2/1977 | Yoshida | 15/102 |
| 4,009,047 | 2/1977 | Lindsay | 15/100 |

(List continued on next page.)

FOREIGN PATENT DOCUMENTS

| | | | |
|---|---|---|---|
| 189770 | 8/1986 | European Pat. Off. | 400/701 |
| 13193 | 2/1981 | Japan | 400/225 |
| 60268 | 5/1981 | Japan | 400/120 |
| 99679 | 8/1981 | Japan . | |

(List continued on next page.)

OTHER PUBLICATIONS

Patent Abstracts of Japan, vol. 8, No. 262 (M–341) 30 Nov. 1984 of JP A–59 133 146 to Fuji Shashin Film, published Jul. 31, 1984.
IBM Technical Disclosure Bulletin–Jun. 1987, pp. 358–359, vol. 30, No. 1.
IBM Technical Disclosure Bulletin–Aug. 1985, p. 1369, vol. 28, No. 3.
IBM Technical Disclosure Bulletin–Aug. 1983, pp. 1586–1587, vol. 26.

*Primary Examiner*—David A. Wiecking
*Attorney, Agent, or Firm*—Merchant, Gould, Smith, Edell, Welter & Schmidt, P.A.

[57] ABSTRACT

A magnetically encoded plastic card production system is provided which includes a supply mechanism for supplying a series of blank plastic cards. An encoder is operatively coupled to the supply mechanism which encodes a magnetic strip on each card. A separating mechanism is operatively coupled following the encoder which has a roller surface for adhesively attracting loose particles from a surface of each card. A design placing mechanism is operatively coupled immediately following the separating mechanism which places a graphic design on each card. In this arrangement, the loose particles are separated from each card subsequent to encoding the magnetic strip on each card and prior to placing the graphic design on each card. A collecting mechanism is operatively coupled to the design placing mechanism which collects each card after each card has passed through the encoder, separating mechanism, and design placing mechanism. A method for producing magnetically encoded plastic cards is also provided.

18 Claims, 22 Drawing Sheets

U.S. PATENT DOCUMENTS

| | | | |
|---|---|---|---|
| 4,018,555 | 4/1977 | Thettu | 219/216 |
| 4,082,037 | 4/1978 | Grindley et al. | 101/425 |
| 4,271,476 | 6/1981 | Lotspiech | 364/515 |
| 4,272,202 | 6/1981 | Schroeder et al. | 400/208 |
| 4,289,666 | 9/1981 | Creekmore et al. | 400/120 |
| 4,321,286 | 3/1982 | Scott et al. | 400/241.2 |
| 4,329,075 | 5/1982 | Applegate et al. | 400/120 |
| 4,343,837 | 8/1982 | DeLorenzo | 400/207 |
| 4,415,908 | 11/1983 | Sugiura | 345/76 PH |
| 4,464,669 | 8/1984 | Sekiya et al. | 400/120 |
| 4,467,335 | 8/1984 | Schmidt et al. | 346/160 |
| 4,490,870 | 1/1985 | Taub | 15/104.002 |
| 4,519,600 | 5/1985 | Warwick et al. | 400/134 |
| 4,536,774 | 8/1985 | Inui et al. | 400/120 |
| 4,545,069 | 10/1985 | Kermisch | 340/727 |
| 4,551,813 | 11/1985 | Sanbayashi et al. | 271/258 |
| 4,560,980 | 12/1985 | Tillich | 340/727 |
| 4,563,691 | 1/1986 | Noguchi et al. | 346/76 PH |
| 4,573,058 | 2/1986 | Brooks | 400/120 |
| 4,577,198 | 3/1986 | Hibino et al. | 400/120 |
| 4,587,530 | 5/1986 | Noguchi | 400/120 |
| 4,590,484 | 5/1986 | Matsushita | 346/76 PH |
| 4,590,487 | 5/1986 | Noguchi et al. | 400/120 |
| 4,590,488 | 5/1986 | Sullivan | 400/120 |
| 4,591,876 | 5/1986 | Nozaki et al. | 400/120 |
| 4,595,935 | 6/1986 | Brooks et al. | 400/54 |
| 4,629,306 | 12/1986 | Warwick | 355/3 R |
| 4,633,269 | 12/1986 | Mikami et al. | 400/120 |
| 4,636,810 | 1/1987 | Asakura et al. | 400/120 |
| 4,639,744 | 1/1987 | Uchikata et al. | 400/120 |
| 4,650,350 | 3/1987 | Dorner | 400/120 |
| 4,651,164 | 3/1987 | Abe et al. | 400/120 |
| 4,651,166 | 3/1987 | Katsuragi | 400/120 |
| 4,663,734 | 5/1987 | Berry | 400/120 |
| 4,675,746 | 6/1987 | Tetrick et al. | 358/296 |
| 4,695,850 | 9/1987 | Nubson | 400/120 |
| 4,712,113 | 12/1987 | Brooks et al. | 400/234 |
| 4,723,132 | 2/1988 | Matsuo | 400/120 |
| 4,747,716 | 5/1988 | van der Eikel | 400/208 |
| 4,755,069 | 7/1988 | LaManna et al. | 400/130 |
| 4,764,041 | 8/1988 | Bierhoff | 400/208 |
| 4,776,714 | 10/1988 | Sugiura et al. | 400/208 |
| 4,781,115 | 11/1988 | Ueda et al. | 101/425 |
| 4,818,126 | 4/1989 | Brooks et al. | 400/120 |
| 4,855,756 | 8/1989 | Gluck et al. | 400/120 |
| 4,896,977 | 1/1990 | Takagi et al. | 400/120 |
| 5,037,216 | 8/1991 | Nubson et al. | 400/120 |

FOREIGN PATENT DOCUMENTS

| | | | |
|---|---|---|---|
| 144172 | 11/1981 | Japan | 400/120 |
| 74181 | 5/1982 | Japan | 400/225 |
| 150588 | 9/1982 | Japan | 400/120 |
| 14792 | 1/1983 | Japan | 400/120 |
| 7387 | 1/1983 | Japan | 400/701 |
| 53456 | 3/1983 | Japan | 400/120 |
| 42471 | 3/1983 | Japan | 460/120 |
| 191175 | 11/1983 | Japan | 400/120 |
| 26774 | 2/1984 | Japan | 355/298 |
| 36276 | 2/1984 | Japan | 355/298 |
| 280992 | 3/1984 | Japan | 400/120 |
| 222374 | 12/1984 | Japan | 400/120 |
| 19550 | 1/1985 | Japan | 400/120 |
| 2391 | 1/1985 | Japan | 400/120 |
| 46268 | 3/1985 | Japan . | |
| 54872 | 3/1985 | Japan . | |
| 42077 | 3/1985 | Japan | 400/120 |
| 87071 | 5/1985 | Japan | 400/120 |
| 99669 | 6/1985 | Japan | 400/120 |
| 165281 | 8/1985 | Japan | 400/249 |
| 192689 | 10/1985 | Japan | 400/241.1 |
| 79688 | 4/1986 | Japan . | |
| 66673 | 4/1986 | Japan | 400/120 |
| 181656 | 8/1986 | Japan | 400/120 |
| 219681 | 9/1986 | Japan | 400/208 |
| 274971 | 12/1986 | Japan | 400/208 |
| 274974 | 12/1986 | Japan | 400/120 |
| 77978 | 4/1987 | Japan . | |
| 83166 | 4/1987 | Japan | 400/120 |
| 202780 | 9/1987 | Japan | 400/249 |
| 208957 | 9/1987 | Japan | 400/120 |
| 35363 | 2/1988 | Japan | 400/701 |
| 56478 | 3/1988 | Japan | 400/701 |
| 2080736 | 2/1982 | United Kingdom | 400/320 |
| 8801941 | 3/1988 | WIPO | 400/120 |

SYSTEM AND METHOD FOR CLEANING AND PRODUCING DATA BEARING CARDS

This is a division of application Ser. No. 08/020,005, filed Jan. 17, 1993, now U.S. Pat. No. 5,401,111 issued Mar. 28, 1995 which is a continuation of application Ser. No. 07/698,733, filed May 10, 1991, now abandoned, which is a division of application Ser. No. 07/249,338, filed Sep. 23, 1988 now U.S. Pat. No. 5,037,216, issued Aug. 6, 1995, which application(s) are incorporated herein by reference.

BACKGROUND OF THE INVENTION

1. Field of the Invention

The present invention relates to a system and method for producing plastic data bearing cards, such as credit cards. More particularly, the present invention relates to a system and method for producing information bearing cards having a graphic design printed thereon which may be varied according to input from a system controller.

2. Description of the Prior Art

A great demand exists in contemporary society for information bearing plastic cards such as credit cards or magnetically encoded cards for use with automatic teller machines (ATMs). Many such cards come with a standardized design thereon which is modified by individual banking institutions, who often seek to place their logos or other identification thereon. These are but only a few of the many examples of the need for being able to transfer images to such items.

Various systems and methods have heretofore existed for transferring images to relatively thick, flexible, non-porous materials such as plastic cards. One example is the use of offset lithography, which is most commonly used in forming the initial design of the cards. Yet another method is the use of hot stamping in conjunction with embossing foils. In addition to other problems, these methods are not sufficiently flexible, because it is very time consuming and expensive to re-tool these systems so as to be able to transfer a different or modified image to the surface of an item.

While thermal printer have been used to create graphics images on paper and the like, they have not been very efficient in transferring images to relatively thick, flexible and non-porous items such as plastic cards. See for example U.S. Pat. No. 4,695,850 which is commonly assigned with the present application, and U.S. Pat. No. 4,650,350 to Dorner. Commonly assigned pending application, Ser. Nos. 235,830 and 937,602 filed Aug. 18, 1988 and Dec. 3, 1986, respectively, disclose thermal printers for printing on plastic items. Ser. No. 235,830 is a continuation of Ser. No. 905,288, which was filed Sep. 8, 1986.

Numerous problems encountered by these various thermal printers when printing on plastic cards include the lack of uniformity in the transfer of ink to the surface of the plastic card, which results in a non-uniform image. The images so derived are often not satisfactory for graphics purposes. The present invention solves these problems and other problems associated with existing systems.

SUMMARY OF THE INVENTION

It is an object of the present invention to provide an apparatus which is capable of printing a graphic design on a hard plastic workpiece such as a credit card blank.

It is further an object of the present invention to provide an improved cartridge assembly for use with a thermal printer head which is effective at guiding a thermal printing foil along a planar printing path and storing used foil after printing.

It is further an object of the present invention to provide an apparatus for removing particulate matter from hard plastic workpieces such as credit card blanks prior to printing a graphic design thereon. It is a secondary object of the present invention to provide a device for stripping such particulate matter off of the cleaning apparatus when it becomes overloaded.

A yet further object of the present invention is to provide an improved thermal printing foil for use in a thermal printing system.

In order to achieve the above objects, the present invention provides a system for producing magnetically encoded plastic cards having a graphic design thereon, comprising structure for supplying a series of blank plastic cards; structure for encoding magnetic strip on the cards; structure for separating loose particles from the cards; structure for placing a graphic design on the cards; structure for embossing a number of alphanumeric characters on the cards; and structure for collecting the cards after the cards have passed through the installing structure, the separating structure, the design placing structure and the embossing structure.

According to the invention, the structure for placing a graphic design on the cards comprises structure for feeding the cards along the work feed path; structure positionable adjacent the work feed path for printing a pattern on the cards; structure for precisely aligning the printing structure with respect to the feeding structure so that the printing structure is adapted to bear against the cards at a constant pressure; and structure for controlling the feeding structure and the printing structure to print a predetermined design on the cards.

According to the invention, the structure for separating particulate matter from the cards comprises cleaning structure having at least one engaging surface adapted for engaging the surface of the cards to be cleaned; structure on the engaging surface for attracting loose particles from the corresponding surface of the cards to be cleaned; structure adapted for feeding a workpiece to the cleaning structure; and structure for removing collected particles from the cleaning structure. According to the invention, a cartridge assembly is further provided for use with a thermal printer or the like, comprising an outer casing having an inside and an outside surface; a length of thermal printing foil disposed substantially within the casing; first spool structure for storing an unused portion of the printing foil; second spool structure for storing a used portion of the printing foil; structure for rotatably supporting the first and second spool structure within the outer casing; and structure for guiding the printing foil from the first spool structure to a guide path line within a printing plane and for guiding the foil from the printing plane path to the second spool structure.

According to the present invention, a method of printing a graphic design on a hard plastic workpiece comprises feeding the workpiece along a work feed path to a position adjacent a resistance type thermal printer; precisely aligning a printing surface of the thermal printer with the surface of the workpiece which is to be printed upon; controlling the printer to print on the desired workpiece surface while continuing to feed the workpiece past the printer; and moving the workpiece away from the printer.

The invention also provides a method for removing particulate matter from at least one surface of a workpiece at a cleaning station, comprising detecting the presence of a workpiece before the workpiece reaches the cleaning station; feeding the workpiece into the cleaning station; engaging the surfaces of the workpiece to be cleaned with a corresponding number of particle attracting elements; removing the workpiece from the cleaning station; determining the total number of workpieces that had been cleaned responsive to the detecting step; and removing particles that have collected on the particle attracting elements whenever the total number of workpieces cleaned exceeds a predetermined number.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
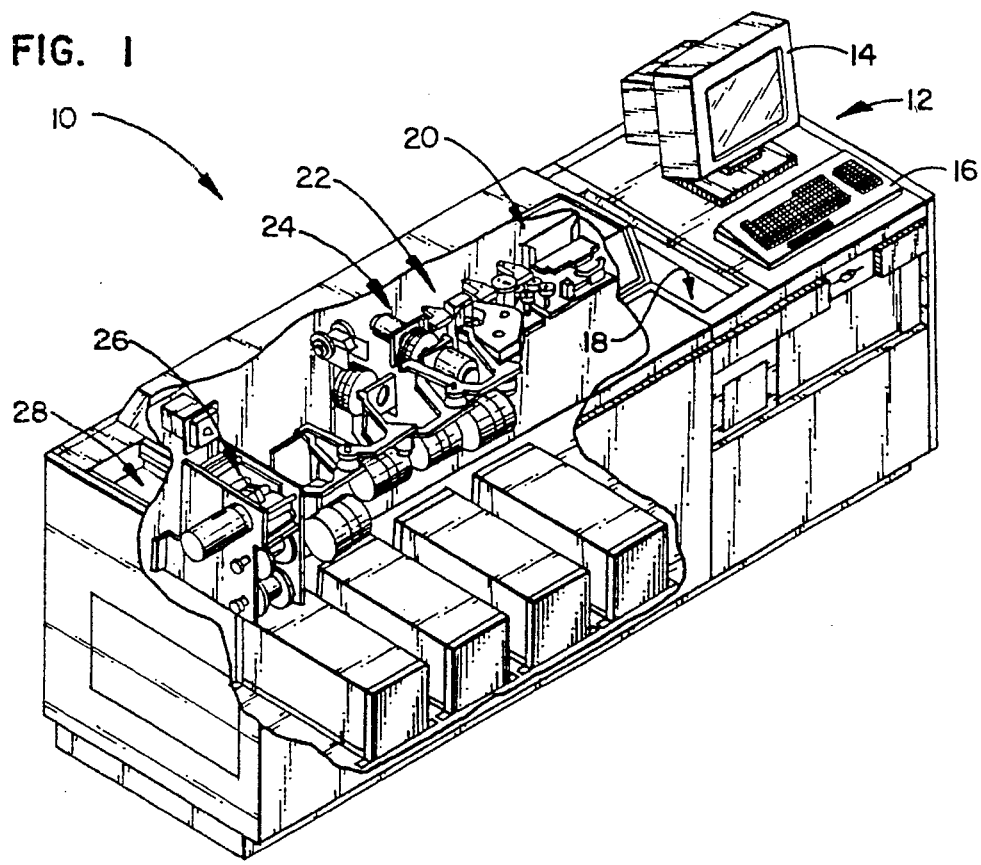
FIG. 1 is a perspective view of a system constructed according to the instant invention, with portions cut away for clarity.

Referring to FIG. 1, a system 10 for producing magnetically encoded embossed plastic cards having a graphic design printed thereon is illustrated. System 10 includes a graphic input terminal 12 having a CRT 14 and a keyboard 16. System 10 further has a card hopper input 18 for holding blank plastic cards prior to processing, a magnetic stripping station 20 for encoding a magnetic strip on a plastic card and a novel graphics station 22 which includes a thermal mass transfer type printer for printing a graphic design on at least one face of the card. In addition, system 10 includes embossing stations 24 for embossing alphanumeric characters into a desired portion of the plastic card or cards. A foil topper station 26 is further provided for coating portions of the card or cards which were raised in embossing stations 24. The system 10 is further provided with an output stacker 28 for storing cards that had been processed at the previously mentioned stations. In the illustrated embodiment, hopper input 18 feeds a blank card to magnetic encoding station 20; the card is then forwarded to the graphic station 22. After processing at graphic station 22, the card is forwarded to the embossing stations 24 which, in turn, pass the card to the foil topper 26. After processing by foil topper 26, the card is passed to output stacker 28 where it may then be removed from the system 10.

Figure 2:
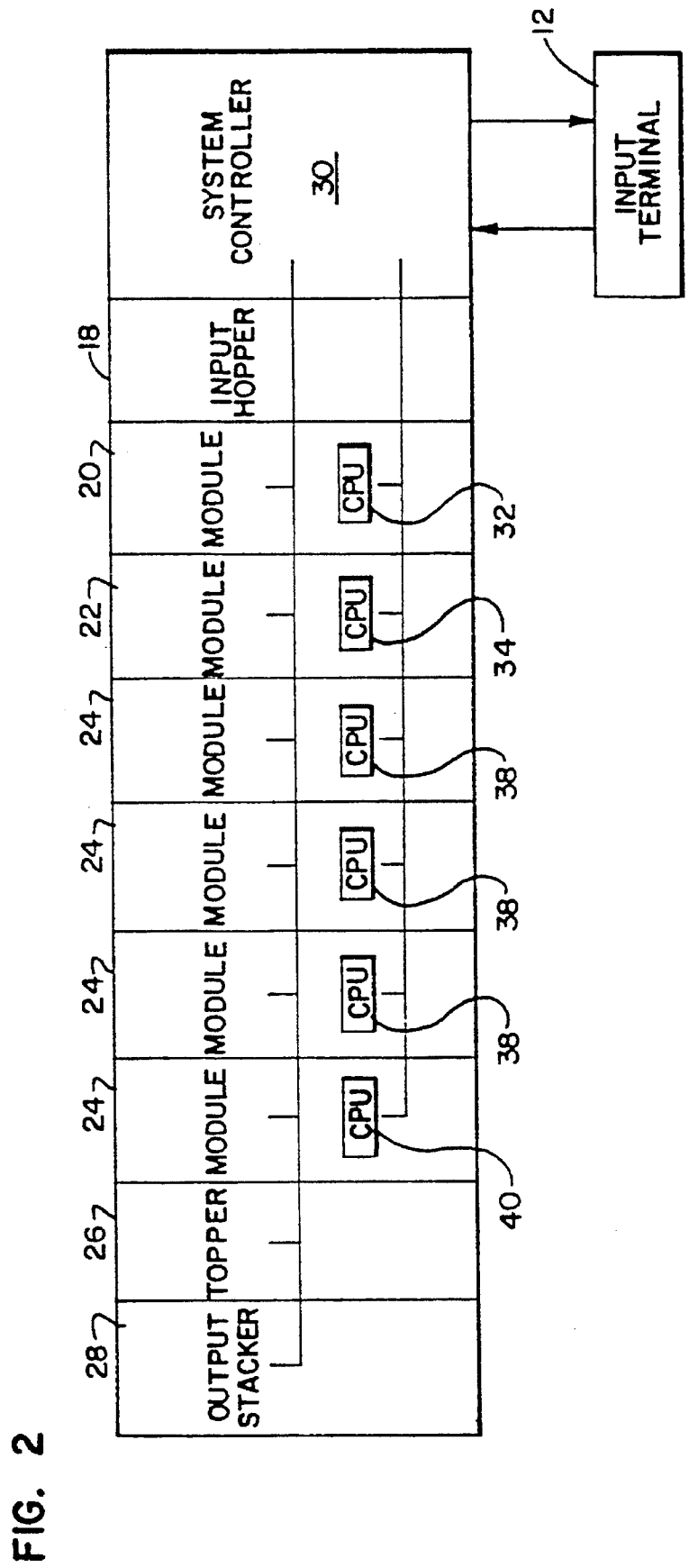
FIG. 2 is a block schematic diagram depicting the control system for the system illustrated in FIG. 1.

Referring now to FIG. 2, the broad system 29 which is used for controlling card producing system 10 is depicted. System 29 includes a system controller 30 which is in communication with alphanumeric input terminal 12, as is shown in FIG. 2. System controller 30 is further in communication with a CPU or card 32 for magnetic stripping station 20, and briefly referring to FIG. 22, with a graphics control CPU or card 34 for graphic station 22. Graphics CPU 34, is preferably in communication with a print engine 502, as will be described further below. Separate CPU's or cards 38 are preferably also provided for embossing station 24, which also is in communication with system controller 30. A further CPU or card 40 may further provide for additional steps or modules as may be required.

As is illustrated in FIG. 2, control system 29 is in communication with input hopper 18, foil topper 26 and output stacker 28. In operation, system controller 30 controls the passage of a card through the various above-described stations in a manner that will be hereinafter described.

Figure 3:
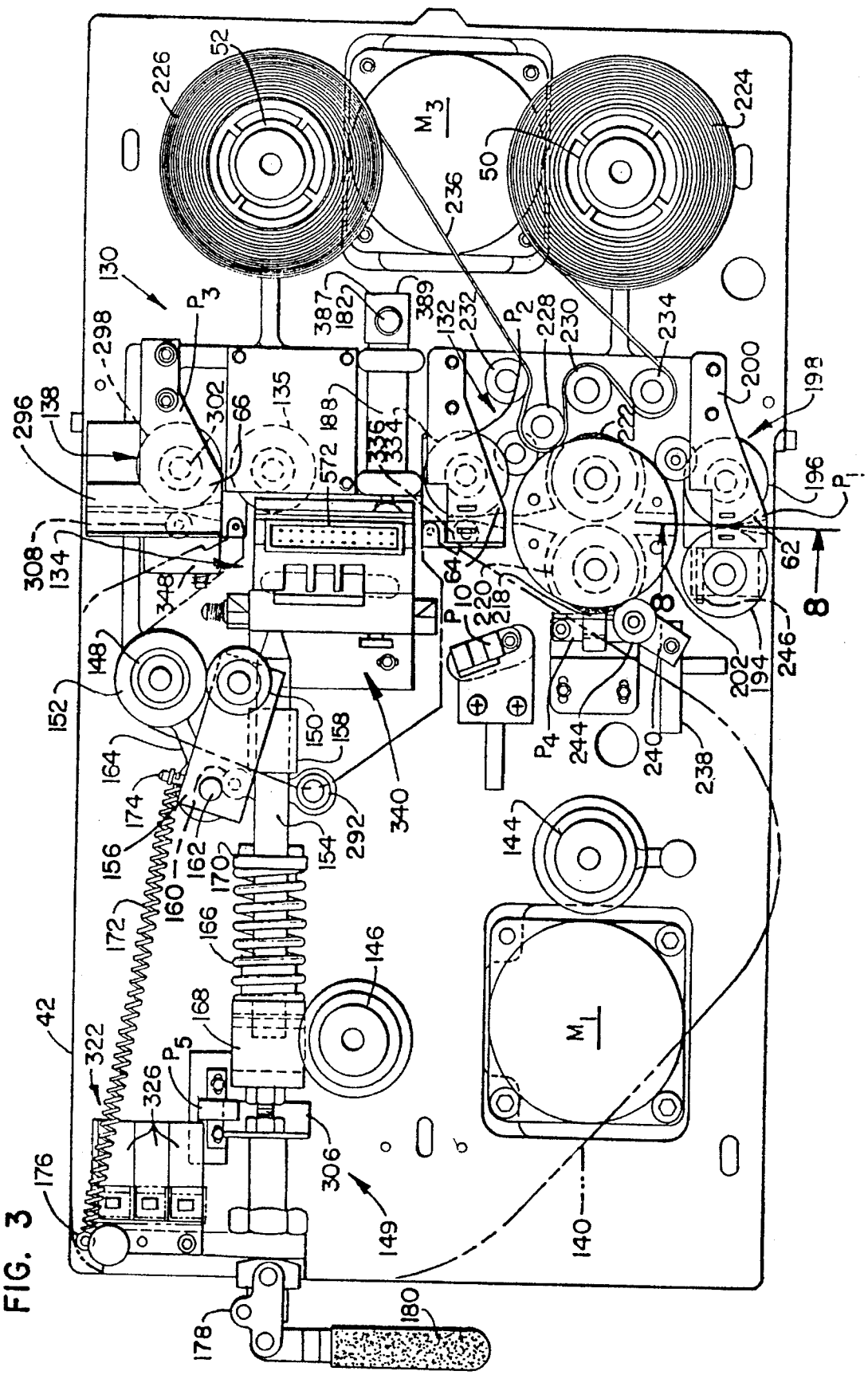
FIG. 3 is a top plan view of the graphic station illustrated in FIG. 1, with a printer foil cartridge illustrated in broken lines.
Figure 4:
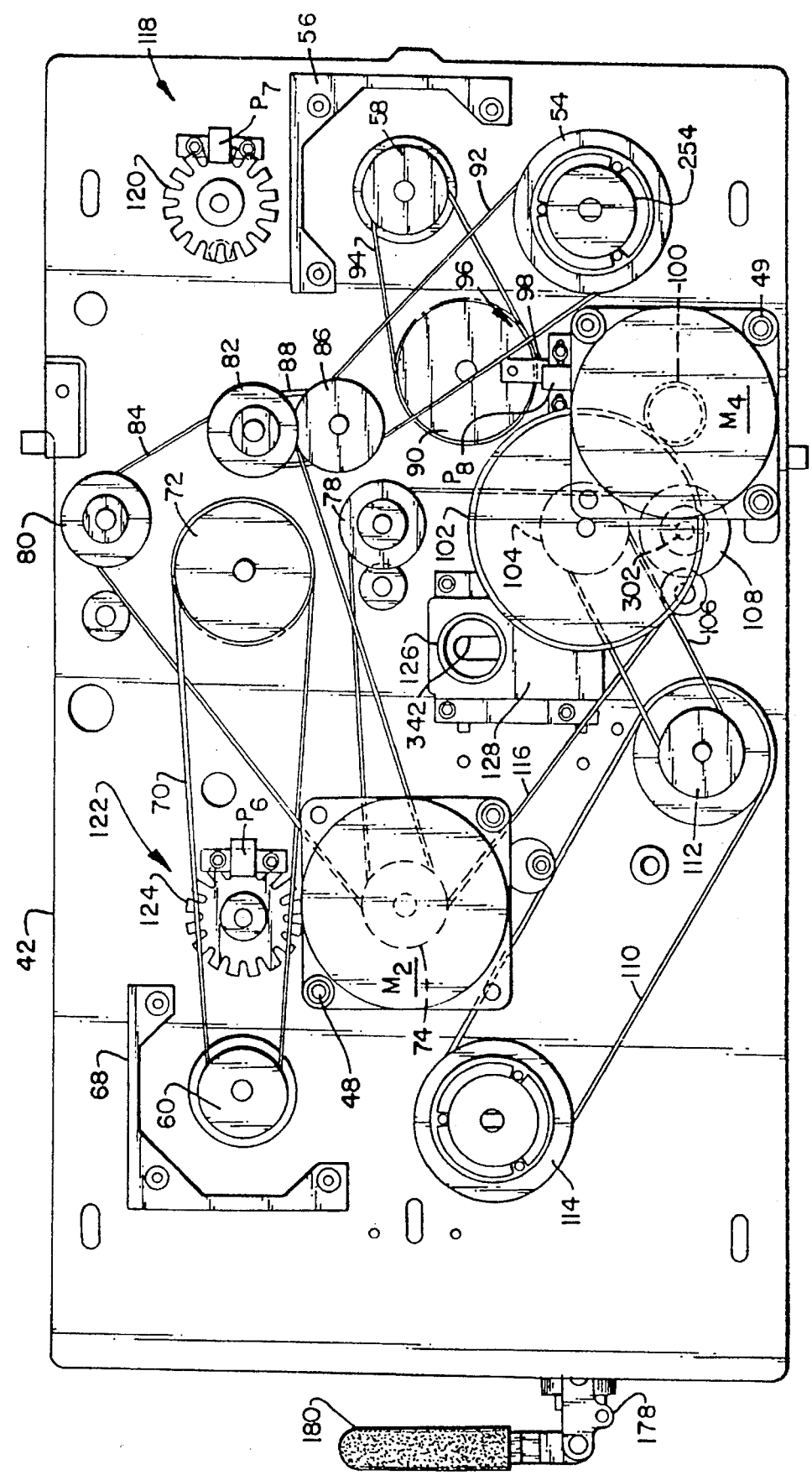
FIG. 4 is a bottom plan view of the assembly illustrated in FIG. 3.
Figure 5:
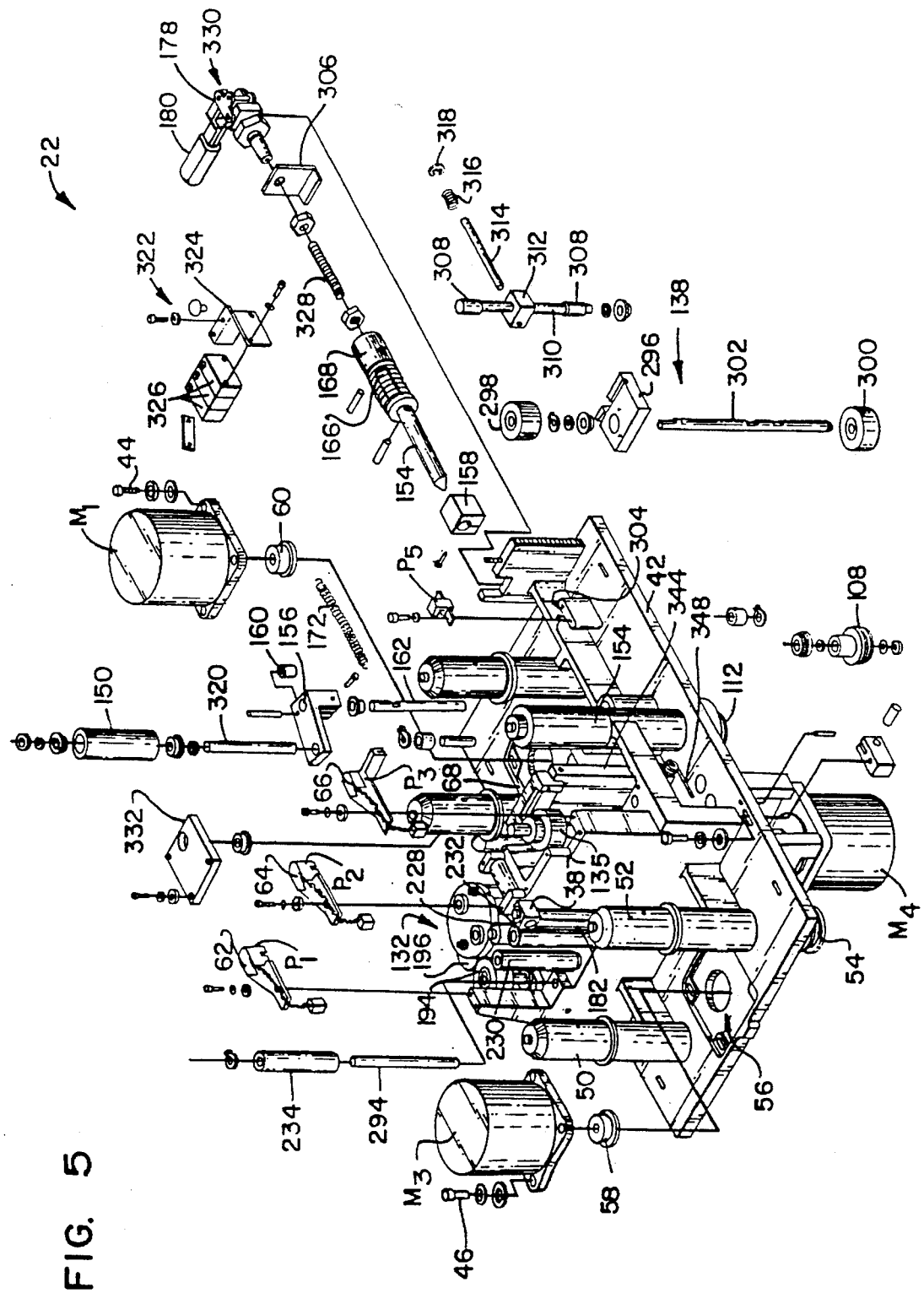
FIG. 5 is an exploded perspective view of the assembly illustrated in FIG. 3.
Figure 6:
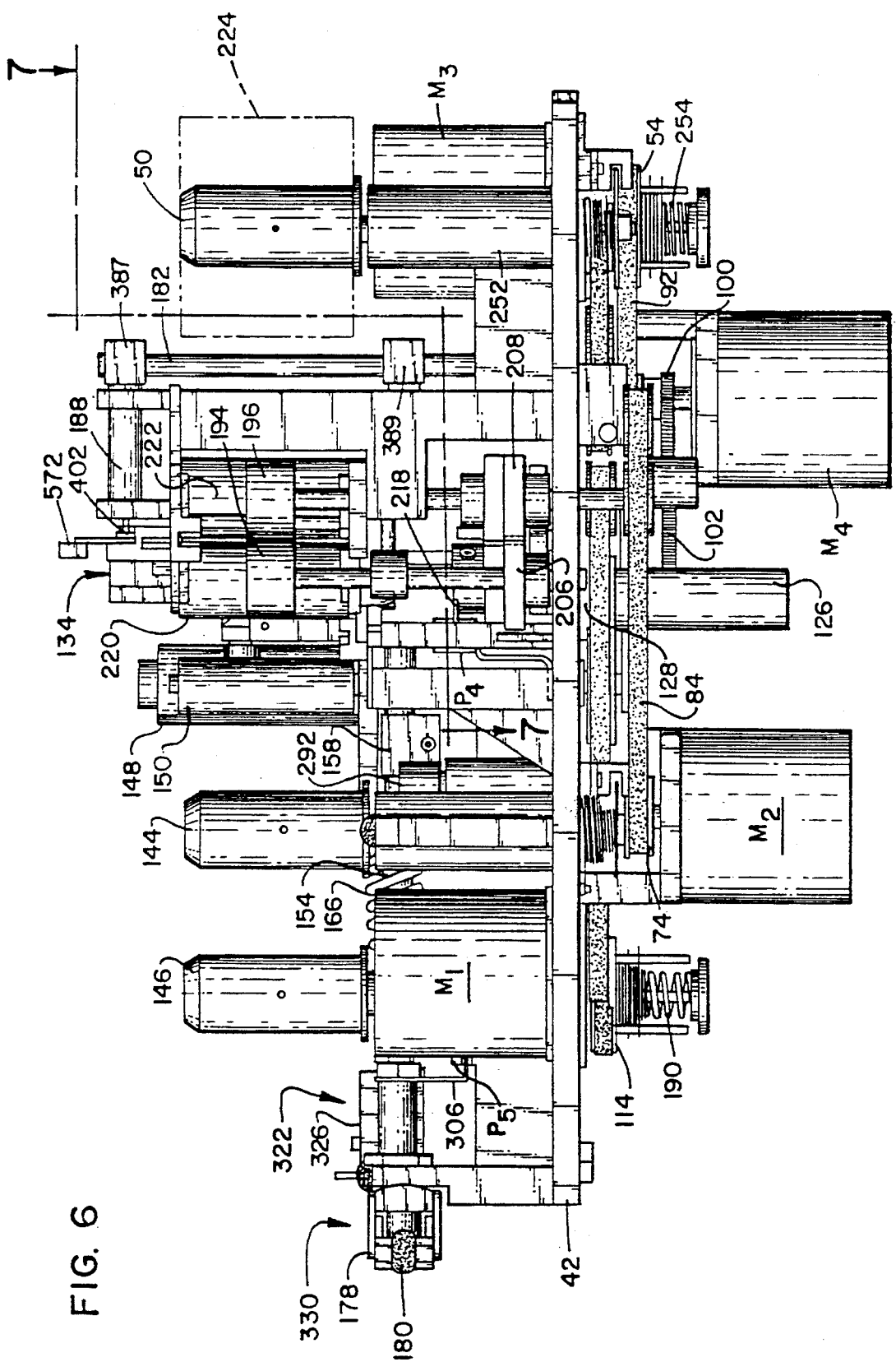
FIG. 6 is a side elevational view of the graphic station assembly illustrated in FIG. 3.

Referring to FIGS. 3–6, the structure and operation of graphic station 22 will now be described. Graphic station 22 includes a main frame member 42 which is securable to the chassis of card producing system 10. Mounted to frame member 42 are a number of stepper motors $M_1$, $M_2$, $M_3$, and $M_4$. Referring briefly to FIG. 5, motor $M_1$ is securable to frame member 42 within a mounting recess 68 (seen in FIG. 4) by a plurality of mounting screws 44. Motor $M_3$ is mounted within a recess 56 by a plurality of mounting screws 46. Briefly referring to FIG. 4, stepper motor $M_2$ is mounted to frame 42 by mounting screws 48. In like fashion, mounting screws 49 secure motor $M_4$ to frame 42.

Referring to FIG. 3, graphic station 22 is formed of a printing unit 130 which is adapted to print a graphic design on a plastic card, and a cleaning unit 132 which is for cleaning loose particles off a plastic card before the card is fed into printing unit 130. In operation, a plastic card is guided along a linear work feed path through cleaning unit 132 and printing unit 130. In order to guide each card along the work feed path, the apparatus is provided with a first top edge guide member 62 for guiding a card into cleaning unit 132, a second top edge guide member 64 for guiding a card from cleaning unit 132 to printing unit 130 and a third top edge guide member 66 for guiding the card out of printing unit 130 and into a subsequent station. In order to facilitate control of the system in a manner that will be described below, first, second and third top edge guide members 62, 64, 66 are each respectively provided with a photosensor P1, $P_2$ and $P_3$ for detecting the presence of a card in a guide slot defined in each of the respective guide members.

Referring to FIGS. 3 and 4, a first stripper tape spindle 50 and second stripper tape spindle 52 are arranged to extend upwardly in a direction normal to an upper surface of frame 42 and are each connected to shafts which extend through frame 42. Spindle 52 is mounted for rotation on frame 42 by a one-way bearing which allows the spindle 52 to move only counterclockwise as viewed in FIG. 7. In this way, the second stripper tape spindle 52 is arranged to rotate with a pulley 54 which is provided beneath frame 42, as is shown in FIG. 4. In like fashion, first stripper tape spindle 50 is arranged to rotate with a serrated disk 120 which is provided beneath frame 42. Serrated disk 120 is adjacent to a photosensor $P_7$ and forms therewith a stripping tape payout motion sensor 118 which is monitored by the control system, as will be below described.

Printing unit 130 is provided with first and second foil drive spindles 144, 146 which each extend through frame 42. Second foil drive spindle 146 is connected for rotation with a pulley 114, and first printer foil spindle 144 is connected for rotation with a serrated disk 124 which together with photosensor $P_6$ forms a motion sensor 122 that is monitored by the control system, as will be described hereinafter. First and second feed rollers 194, 196 are provided at the entrance to cleaning unit 132 and are connected for synchronous rotation. Second feed roller 196 is connected for rotation with a feed roller input pulley 80 provided beneath frame 42. As is illustrated in FIG. 3, a stripper roller 228, a first stripper guide roller 230, a second stripper guide roller 232 and a third stripper guide roller 234 extend vertically from the top surface of frame 42. First and second stripper guide rollers 230, 232 are connected for rotation, respectively, with a first stripping tape guide roll input pulley 82 and a second stripping tape guide roll input pulley 86 which extend beneath frame 42. Cleaning unit 132 further includes a turret body 202 which is arranged to rotate with a turret input pulley 72 that extends beneath frame 42. Stepper motor $M_1$ is connected to an output pulley 60 that extends beneath frame 42. A first timing belt 70 engages $M_1$ output pulley 60 and the turret input pulley 72 so as to turn the turret body 202 in non-slipping fashion when motor $M_1$ is instructed to turn by the control system. Similarly, stepper motor $M_2$ is provided with an output pulley 74 which is arranged to rotate the feed roller input pulley 80 and a first portion of input pulley 82 by means of a second timing belt 84, as is best shown in FIG. 4. A second pulley portion of first input pulley 82 and a second pulley portion of input pulley 86 are connected for synchronous rotation by a third timing belt 88. Pulley 82 is provided with a one-way clutch between the first and second pulley portions thereof which allows clockwise relative movement of the second pulley portion relative to the first pulley portion as viewed in FIG. 4.

For a purpose that will be described later, printer unit 130 is provided with a cam shaft 182 which is connected for rotation with a cam shaft input pulley 90 arranged beneath frame 42. Cam shaft input pulley 90 is adapted to be rotated by an output pulley 58 which is connected to stepper motor $M_3$ by a fourth timing belt 94, as is shown in FIG. 4. Briefly referring to FIG. 12, printing unit 130 is provided with a first printer feed roller pair 334, 336. Roller 334 is connected for rotation with a first printer feed roll input pulley 78 which extends beneath frame 42, as is shown in FIG. 4. Printing unit 130 further includes a second print feed roller pair 138, which, as illustrated in FIG. 5, includes a first pair of rollers 298, 300 adapted to rotate with a drive shaft 302 and a second pair of smaller diameter rollers 308 adapted to rotate with a support shaft 310. Referring again to FIG. 4, drive shaft 302 for the second print feed roller pair 138 is connected to a pulley 108 which extends beneath frame 42. Output pulley 74 for stepper motor $M_2$ drives first printer feed roll pulley 78 and second printer feed roll pulley 108 by means of an eight timing belt 116. In addition, second stripper tape spindle pulley 54 is driven by a first pulley portion of the second stripping tape guide roll input pulley 86 by means of a fifth timing belt 92. In this way, stepper motor $M_2$ performs the dual function of driving all of the feed roll pulleys 80, 78, 102 as well as the first and second stripping tape guide rolls input pulleys 82, 86 and the second stripper tape spindle pulley 54, in a manner that will be described further below.

Referring again to FIG. 4, stepper motor $M_4$ is provided with an output pinion 100 which engages a reduction gear 102. Reduction gear 102 is connected for rotation with an $M_4$ output pulley 104. Referring briefly to FIG. 3, printing unit 130 includes a first capstan roller guide 148 for guiding a printer tape during the printing process. First capstan roller guide 148 is connected for rotation with a capstan roller guide input pulley 112 which, in turn, is connected for rotation with $M_4$ output pulley 104 by a sixth timing belt 106. In addition, capstan roller guide input pulley 112 is constrained to rotate with the pulley 114 for the second foil drive spindle 146 by a seventh timing belt 110. Printing unit 130 is provided with a printer roller 135, for purposes which will be clarified below. Printer roller 135 is constrained for rotation with $M_4$ output pulley 104. In this way, $M_4$ controls the rotation of print roller 135, the first capstan guide roller 148 and the second printer foil drive spindle 146.

Also provided beneath frame 42, as viewed in FIG. 4, is a cam shaft position sensor 96 which includes a photosensor $P_8$ and a cam shaft flag 98 mounted on the cam shaft input pulley 90. The cam shaft position sensor 96 allows the control system to monitor the position of the cam shaft at any given time.

Also mounted beneath frame 42 is an air supply plenum 126 which is connected to a central air supply duct for the overall card producing system 10. Plenum 126 communicates with a box-shaped manifold 128 which, in turn, is in communication with a passage 342 through frame 42 to allow air from the manifold 128 to cool selected areas of the printing unit 130 during operation.

Figure 12:
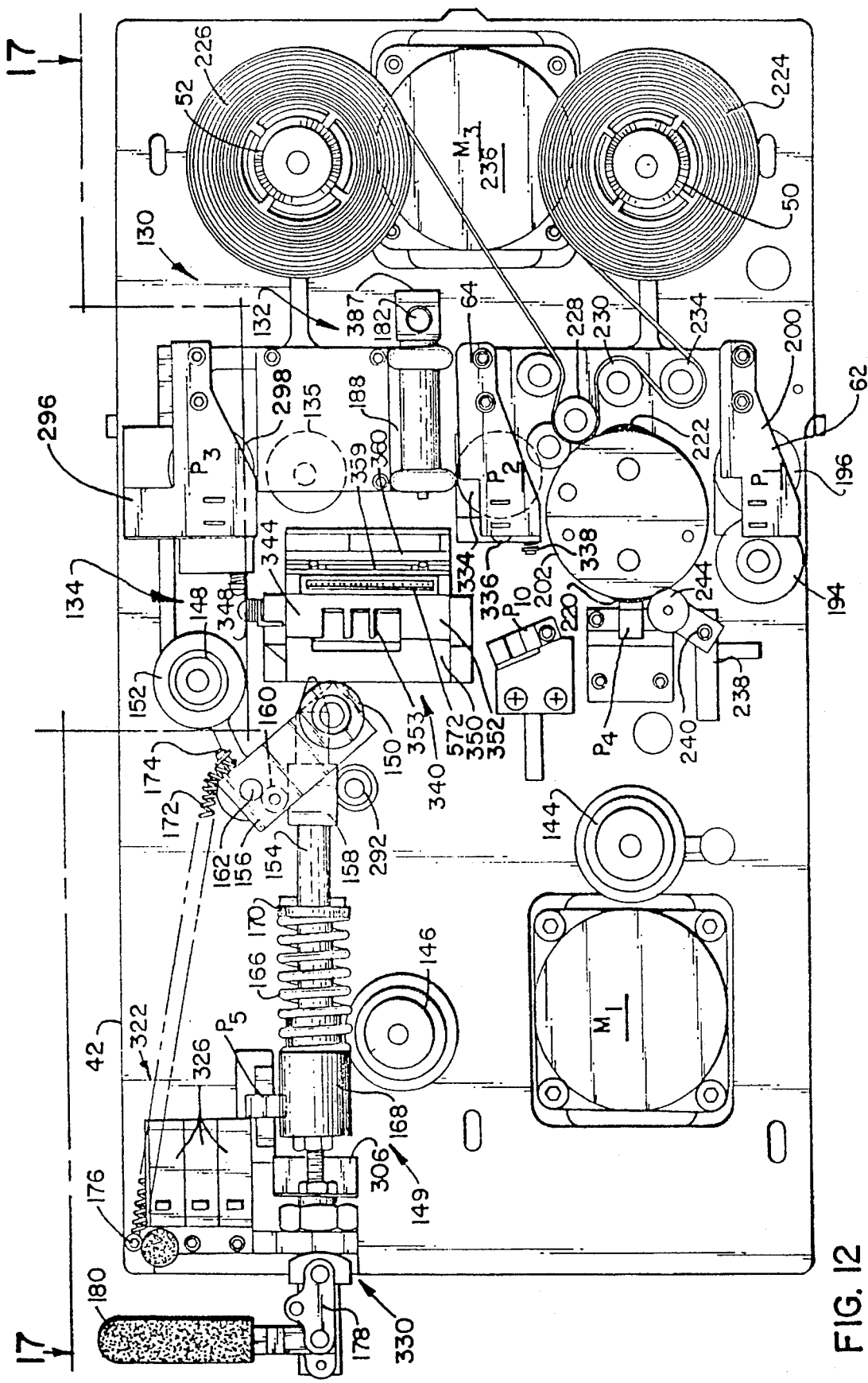
FIG. 12 is a top plan view similar to that illustrated in FIG. 3, with the printer head illustrated in its released condition.

Referring again to FIG. 3, printing unit 130 includes a printing head assembly 134 including a printing head 340, the printer roller 135 first print feed roller pair 334, 336, and second print feed roller pair 136, 138. A thermal printing foil 142 is provided in a cartridge 140 and guided when the cartridge is positioned through a printing plane which extends between printing head 340 and print roller 135. In order to secure cartridge 140 in its proper position on printing unit 130, and to properly orientate printing head 340, a positioning mechanism 149 is provided which includes a plunger 154 movable by a toggle linkage 178 and handle 180 from a first open position as is shown in FIG. 12 to a second closed position, as is shown in FIG. 3. In the closed position, plunger 154 is urged against a pivot plate 344 of the printer head assembly 134 to urge printing head 340 and specifically a thermal print line 374 thereon against print roller 135. In the closed position, as illustrated in FIG. 3, plunger 154 is biased against pivot plate 344 by a compression spring 166 which is interposed between a spring seat 168 attached to the toggle actuation mechanism and a spring stop 170 on plunger 154. As shown in exploded FIG. 5, spring seat 168 is attached to the overall toggle-handle linkage 330 by a threaded rod 328; and a flag member 306 is interposed between threaded rod 328 and the toggle-handle linkage 330. A photosensor $P_5$ is mounted on an upwardly extending mounting surface 304, which is part of frame member 42, so as to be positioned to detect movement of flag 306. As a result, the control system can monitor the position of plunger 154 during operation of the printing unit.

Referring again to FIG. 3, the first stationary capstan guide roller 148 is provided with an outer resilient surface 152 and is mounted on a structural support rib 164 provided on frame 42 so as to rotate about an axis stationary relative to frame 42. A second capstan guide roller 150 is provided to rotate about a pin extending through a pivot block 156, as is shown in FIG. 3. Pivot block 156 is mounted to pivot about a pivot shaft 162 which extends upwardly from a pivot support bearing and structural support rib 164. A tension type spring 172 is stretched between a first mounting screw 176 provided on frame 42 and a second mounting screw 174 provided on pivot block 156 so as to urge pivot block 156 in a counterclockwise direction, thereby forcing second capstan guide roller 150 against the outer resilient surface 152 of first capstan guide roller 148. Pivot block 156 is further provided with a cam pin and bushing 160 and a bearing block guide roller 292 which are adapted to bear against a bearing block 158 provided on plunger 154.

When the overall toggle-handle linkage 330 is opened to withdraw plunger 154 to the position illustrated in FIG. 12, cam pin 160 is forced rearwardly by bearing block 158, thus causing pivot block 156 to pivot in a clockwise direction about pivot shaft 162, thereby separating first capstan guide roller 148 from the second capstan guide roller 150. In this position, as described in FIG. 13 a cartridge 140 may be easily inserted into the printing unit 130 by aligning a pair of circular recesses 262 which are provided in the cartridge 140 with the first and second foil drive spindles 144, 146 so that printing foil 142 stretches between the separated capstan guide rollers 148, 150.

At the same time, printing head 340 is allowed to pivot rearwardly toward plunger 154 by a torsion spring 348 which urges pivot plate 344 in that direction, so that the printing foil 142 may be stretched between the printing head 340 and print roller 135. After the cartridge 140 has been so positioned on printing unit 130, toggle-handle linkage 330 may be closed, which causes plunger 154 to urge the printing head 340 toward printer roller 135 and causes the first and second capstan guide rollers 148, 150 to be urged together in a printing foil driving position.

Figure 18:
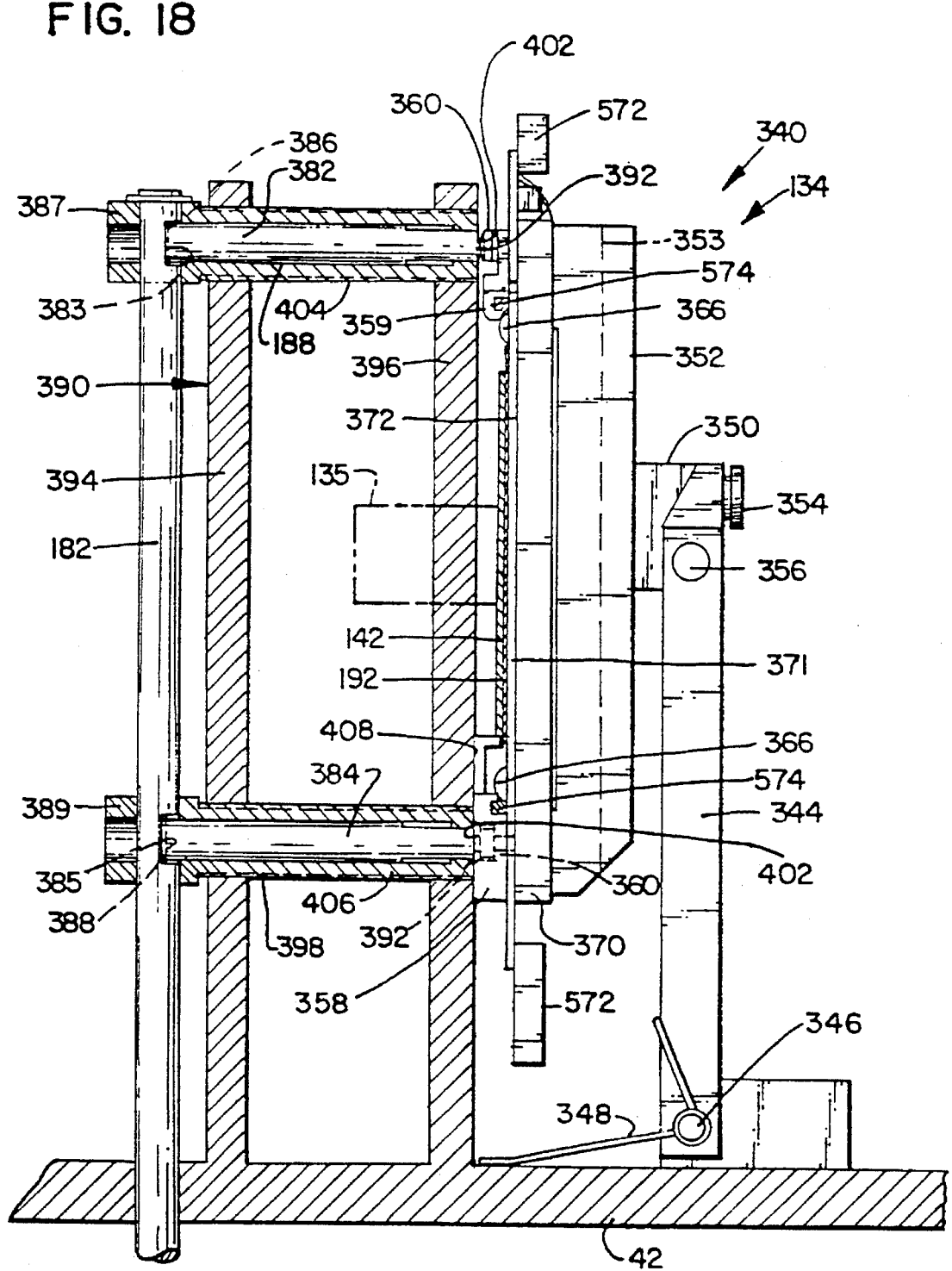
FIG. 18 is a cross-sectional view taken along lines 18—18 of FIG. 13.
Figure 19:
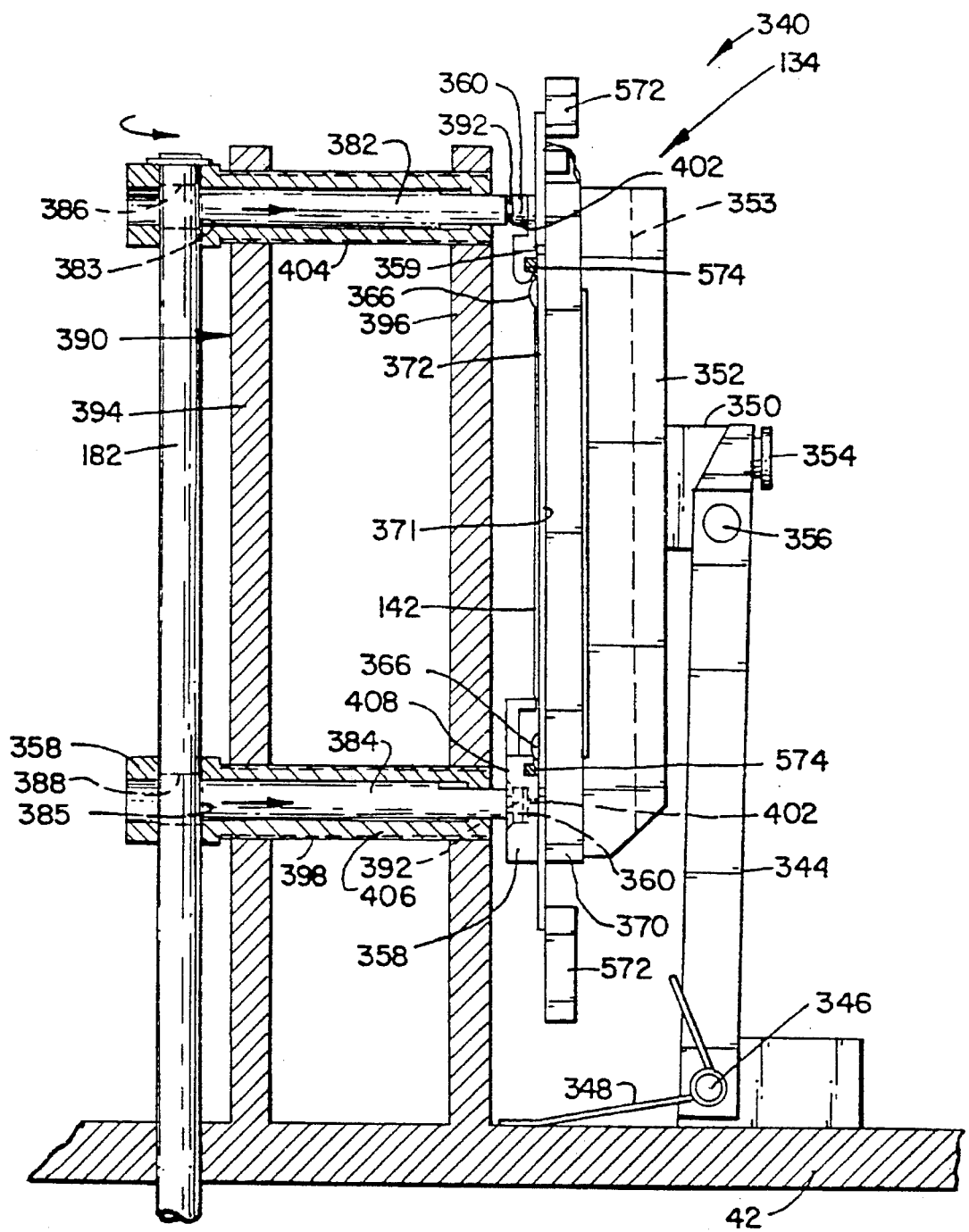
FIG. 19 is a cross-sectional view similar to FIG. 18 with the printer head shown in its released position.

Referring briefly to FIGS. 18 and 19, the invention also includes structure for urging the printer head assembly 134 away from the work feed path of a card 192 against the resilient biasing provided by plunger 155 and compression spring 166 responsive to instructions provided by the control system. As was stated above in reference to FIG. 4, a stepper motor $M_3$ drives a cam shaft 182 through a pair of pulleys 58, 90 and a fourth timing belt 94. As shown in FIG. 18, cam shaft 182 extends upwardly through frame 42 and includes a first cam surface 386 and a second cam surface 388. First cam surface 386 is supported within a first cam housing 387 and second cam surface 388 is supported within a second cam housing 389. A first retractor rod 382 is supported for reciprocation within a first retractor rod housing 188 and a second retractor rod 384 is likewise supported for reciprocation within a second retractor rod housing 398. The first and second retractor rod housings 188, 398 each are provided with a threaded external surface 404, 406, respectively. Frame 42 includes an upstanding support member 390 having a first trunnion like extension 394 and a second trunnion like extension 396. Each of the first and second extensions 294, 396 have a pair of threaded holes defined therein adapted to receive the threaded outer surfaces 404, 406 of first and second retractor rod housings 188, 398. As shown in FIG. 18, the first and second retractor rod housings 188, 298 are adjoined to the first and second cam housings 387, 388, respectively.

Each of the first and second retractor rods 382, 384 are provided with a cam follower surface 383, 385, respectively, for engaging the first and second cam surfaces 386, 388 on cam shaft 182. Each of the retractor rods 382, 384 further have an adjustable contact tip 392 at an opposite end thereof for engaging corresponding contacts 402 which are provided on the printer head assembly 134. In actuality, contacts 402 are surfaces of mounting screws 360, which will be described hereinbelow.

In operation, when the control system instructs stepper motor $M_3$ to turn the cam shaft 182, the first and second retractor rods 382, 384 and their corresponding follower surfaces 383, 385 are cammed by the first and second cam surfaces, 386, 388 on cam shaft 182, thereby forcing retractor rods 382, 384 toward the printer head assembly 134. As a result adjustable contact tips 392 of the respective retractor rods 382, 384 bear against the contacts 402 on the printer head assembly 134 and thereby urge the printer head assembly rearwardly against the bias of compression spring 166, as is shown in FIG. 19. At the same time, the position of cam shaft 182 may be monitored by the cam shaft position sensor 96 which is illustrated in FIG. 4 and has been previously discussed.

Figure 16:
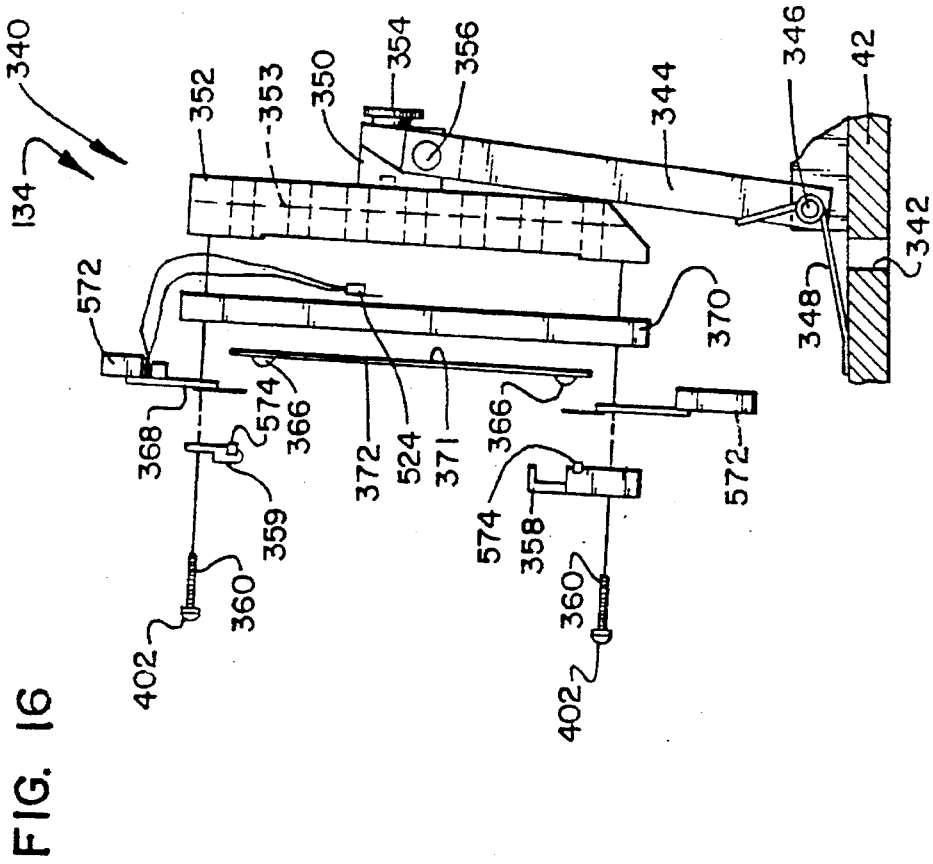
FIG. 16 is an exploded elevational view of the printer head assembly of the invention.
Figure 17:
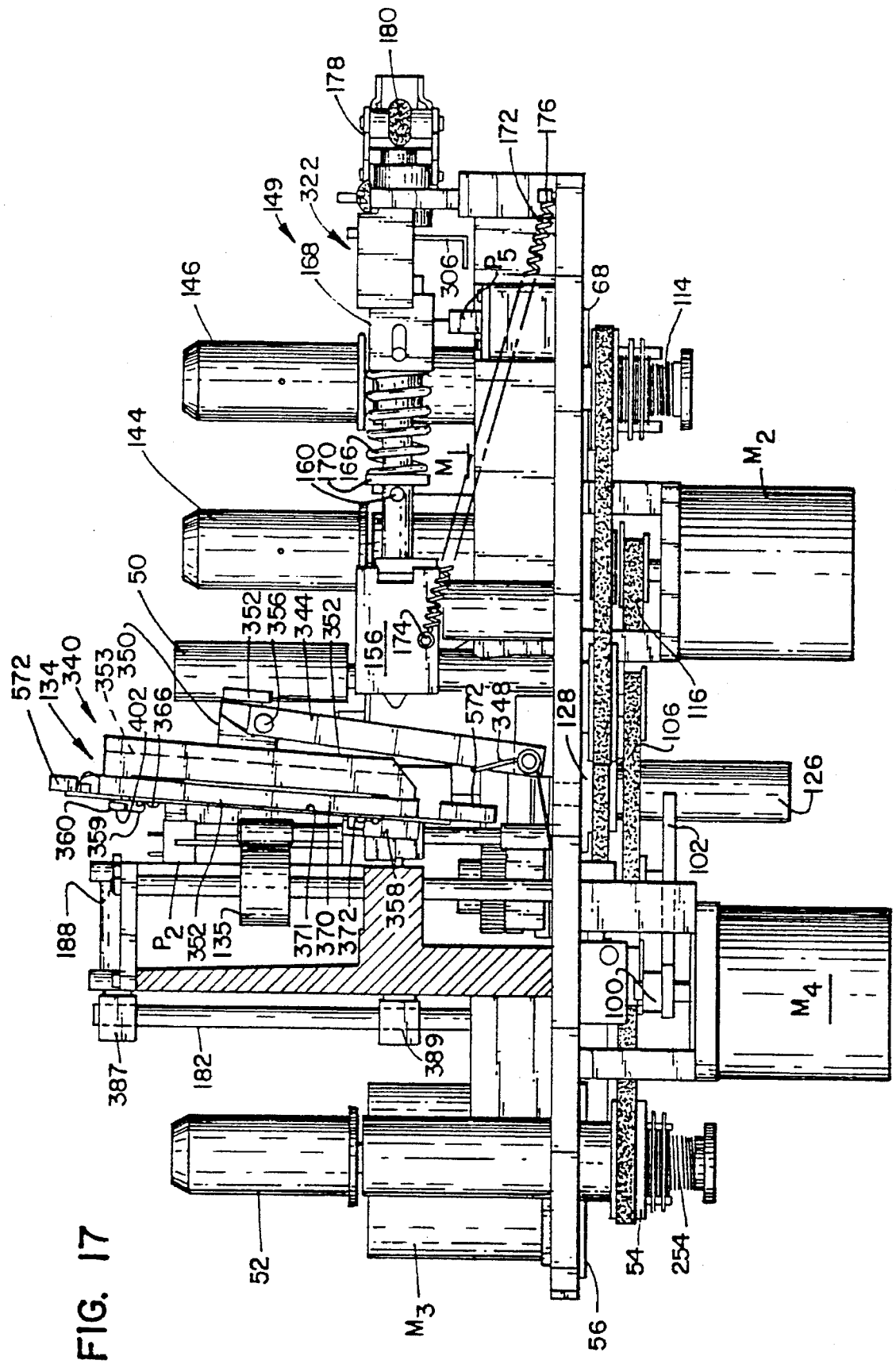
FIG. 17 is a cross-sectional view taken along lines 17—17 in FIG. 12.
Figure 20:
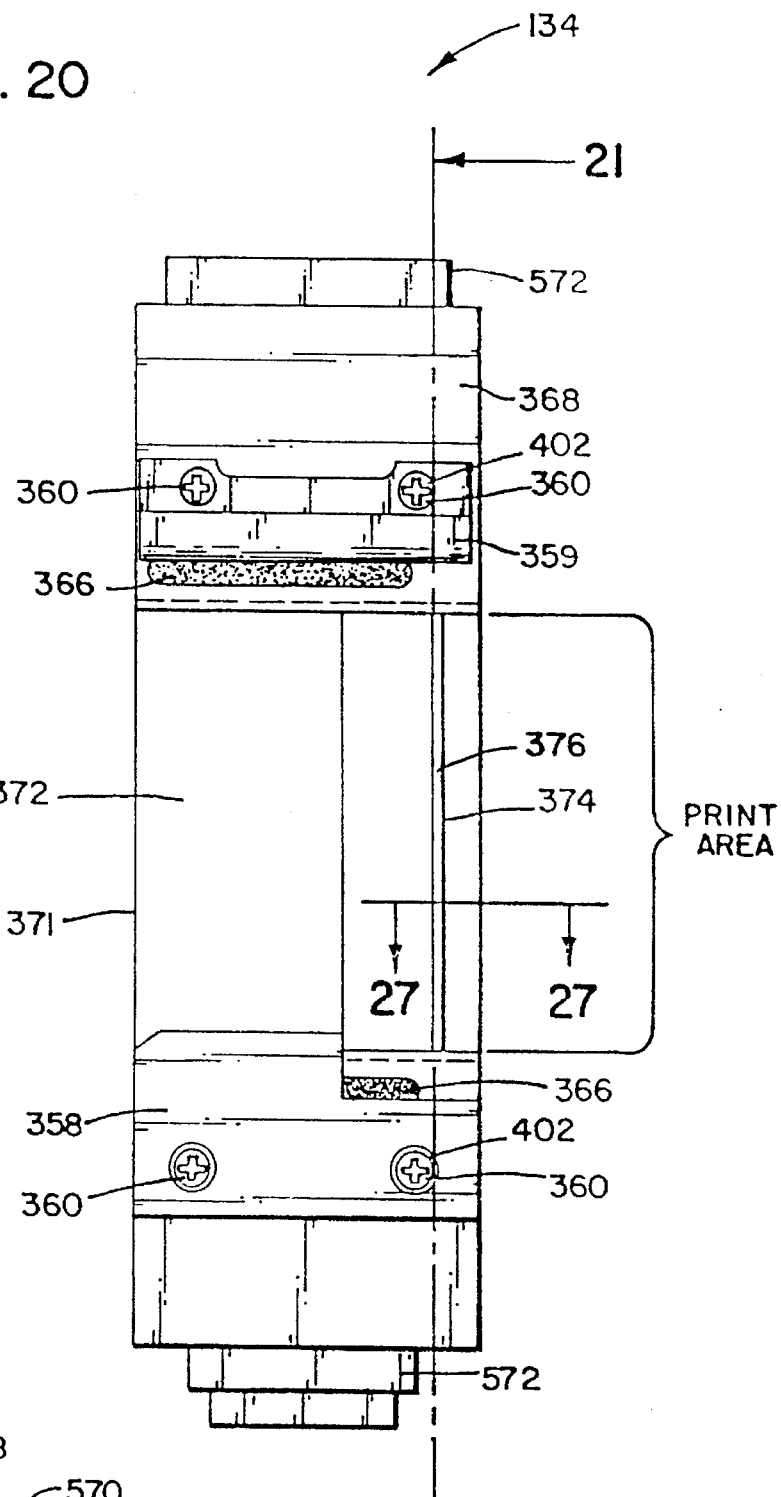
FIG. 20 is an isolated elevational view of a printing surface of the printer head of the invention.
Figure 27:
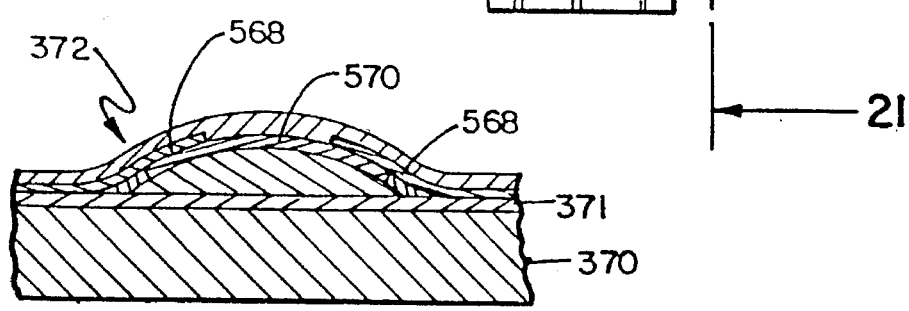
FIG. 27 is a profile of a resistive dot element according to the invention.

Referring now to FIGS. 16, 20, 21 and 27, the structure of printer head assembly 134 will now be discussed. As is best shown in FIG. 16, printing head 340 includes an aluminum heat sink portion 370 which is coated on one side thereof with a ceramic substrate 371. Referring briefly to FIG. 20, the front surface of the printing head 340 includes a thermal print line 374 which has a multiplicity of thermal print resistive elements 376 therein which may be heated according to a predetermined algorithm, which will be discussed hereinafter, in order to induce printing foil 142 to produce the desired graphic pattern upon a workpiece. The ceramic substrate 371 is coated with a partial glaze along the print line 374 to give the thermal print line 374 an elevated shape of 0.001 to 0.003 inches. On top of this glazed portion, a resistive material 570 (0.9 micron thick) is deposited and a number of conductive leads 568 (1.0 micron thick) corresponding to the number of thermal print elements 376 are deposited upon the glazed portion. The area is then coated with a wear layer 372 of silicon carbide or silicon nitride and a print head drive electronics module 366 is bonded directly onto the ceramic substrate 371 with its connections made directly to the conductive leads for the microresistors. As may be seen in FIG. 19, the electronic modules 366 are positioned above and below the workfeed path so as to permit unimpeded passage of the workpiece along a linear paths. Upper and lower external electronic connectors 572 are interfaced to the ceramic substrate 371 which includes gold coated leads via flex circuit leads 368 and a compliant silicon rubber block 574 which is clamped by members 359 and 358. A lower card guide 358 and a clamping member 359 are then secured to the printing head 340 by means of a number of mounting screws 360, as is shown in FIG. 16.

Referring again to FIG. 16, a novel mounting structure for the printing head 340 includes a backing block 352 having a plurality of heat dissipating fins 353 thereon which is secured to printing head 340 by a number of mounting screws 410.

In order to ensure even pressure distribution across the printing line 374, the mechanism supporting the print head has been designed to have low mechanical compliance in the horizontal plane and yet allow the print head to align with the print roller 135. Accordingly, the support mechanism in the printer head assembly 134 has been designed as a single link which allows the assembly to be pivoted away from the print roller 135 for foil replacement and also allows the printing head 340 to pivot and follow the minor imperfections of the print roller 135 and minor workpiece thickness variations. This link reacts to horizontal moments and forces which are caused by bearing spacing and tolerance deviations of components in the link In order to ensure acceptable printing quality, total mechanical deflection of the print head assembly 134 must be less than 10% of the physical size of one printed dot, which is approximately 0.0004 inches.

Figure 21:
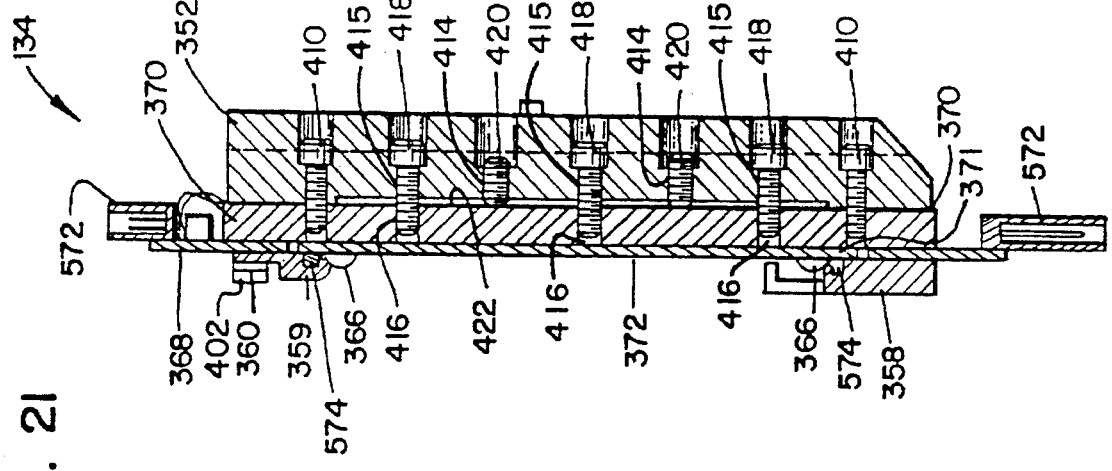
FIG. 21 is a cross-sectional view taken along lines 21—21 of FIG. 20.

In order to correct for tolerance deviations in the printing head 340, which may be slightly warped, the invention includes a novel prestressing arrangement 412, which is best shown in FIG. 21. According to the invention, backing block 352 is provided with a multiplicity of threaded holes 414 and unthreaded holes 415 which extend toward the interface with heat sink 370 of the printing head 340. Heat sink 370 has a lesser number of threaded holes 416 defined therein which are aligned with unthreaded holes 415 in backing block 352. In the illustrated embodiment, backing block 352 is provided with a total of two such threaded holes 414, and three unthreaded holes 415. Heat sink 370 is provided with three threaded holes 416 which are aligned with the unthreaded holes 415. Three adjustment bolts 418 are inserted into the corresponding unthreaded holes 415, and are threadable within the holes, which draws heat sink 370 and backing block 352 together at those discrete points. In the threaded holes 414, which are not aligned with corresponding holes in heat sink 370, compressive type jackscrews 420 are insertable which bear against a rear surface of heat sink 422 and are tightenable thereagainst so as to exert a compressive force, thereby urging heat sink 370 away from backing block 352 at those discrete points and tensioning the bolts 418. By suitably adjusting mounting screws 410 and adjustment studs 420, deviations in tolerance of the printing head 340 obtained from a supplier may be corrected for, thereby improving the alignment of the printing head with print roller 135.

Backing block 352 is securley fixed to a support block 350 by a thumb screw knob connection 354 as is shown in FIG. 16. Support block 350 is pivotally mounted with respect to pivot plate 344 by a bearing 356. Pivot plate 344 is pivotally mounted with respect to frame 42 by a pivot plate bearing shaft 346 and is torsionally biased with respect to frame 42 by torsion spring 348, as has been previously described. Thus, a single link is achieved which allows the print head assembly to be pivoted away from the print roller for foil replacement and also allows the print head assembly to pivot and follow the minor imperfections of the print roller and minor card thickness variations.

As has been previously discussed, print roller 135 is mounted for rotation upon a shaft which is connected to the output pulley 104 of stepper motor $M_4$. Print roller 135 is aligned with thermal print line 374 and preferably has an outer resilient layer capable of supporting a workpiece against deflection relative to the thermal printing line during printing. In the preferred embodiment, print roller 135 is made of a 90 shore A durometer elastomer that has good friction characteristics and yet has some ability to allow for minor card thickness variations along the print head axis. This construction of print roller 135 in conjunction with the above-discussed measures for ensuring the alignment of printing head 340 results in a total mechanical deflection of the print head assembly relative to print roller 135 which is less than the critical value of approximately 0.0004 inches.

As previously discussed, the printing unit 130 includes a first set of printer feed rollers 334, 336 which are rotated by stepper motor $M_2$ through the first printer feed roller pulley 78 and eighth timing belt 116. As is may be seen in FIG. 12, printer feed roller 334 has a resilient outer surface and is larger than roller 336, which has a vinyl or other high friction outer surface. Resilient roller 334 is mounted for rotation with pulley 78, and roller 336 is rotated by friction applied by roller 334. Rollers 334 and 336 are biased together by a spring arrangement 338 which acts upon a bearing block in which the smaller roller 336 is constrained to rotate. A second pair of rollers similar in shape to rollers 334 and 336 are provided on the same shafts which support those rollers, but are positioned beneath the work feed path and serve the purposes of aiding alignment and driving of the two shafts. The shafts supporting rollers 334, 336 are mounted in one-way pulley clutch bearings in a manner similar to the mounts for rollers 194, 196 so that the workpiece is driven at the speed of the fastest feed roller or print roller. The second feed roller pair 138 is likewise so mounted.

Referring now to exploded FIG. 5, a second set of printer feed rollers 138 includes a first upper print feed roller 298 having a resilient outer surface and a second upper print feed roller 308 having a vinyl or other high friction surface and a smaller diameter than roller 298. First upper print feed roller 298 is constrained to rotate with drive shaft 302, which also has a lower print feed roller 300 mounted thereon and is adapted to engage a second upper print feed roller 308 on support shaft 310 which supports roller 308 for rotation herewith. Drive shaft 302 for the first upper print feed roller 298 is connected to a pulley 108 which is adapted o be driven by stepper motor $M_2$ in a manner previously described. When $M_2$ turns drive shaft 302 responsive to an instruction from the control system, the first upper print feed roller 298 turns to help feed a workpiece out of the printer unit 130 and into the next station. At this time, second upper feed roller 308 and support shaft 310 turns due to friction of the workpiece or to friction between lower printer feed roller 300 and the lower roller 300 on shaft 310. Rollers 298 and 308 are biased toward each other by a compression spring 316 which is secured on a bearing guide 314 by a retaining ring 318 and acts against a bearing block 312 within which support shaft 310 is constrained to rotate. A lower print assembly card guide 296 is provided beneath rollers 298, 308 for ensuring straight passage of the workpiece along the work feed path.

Figure 13:
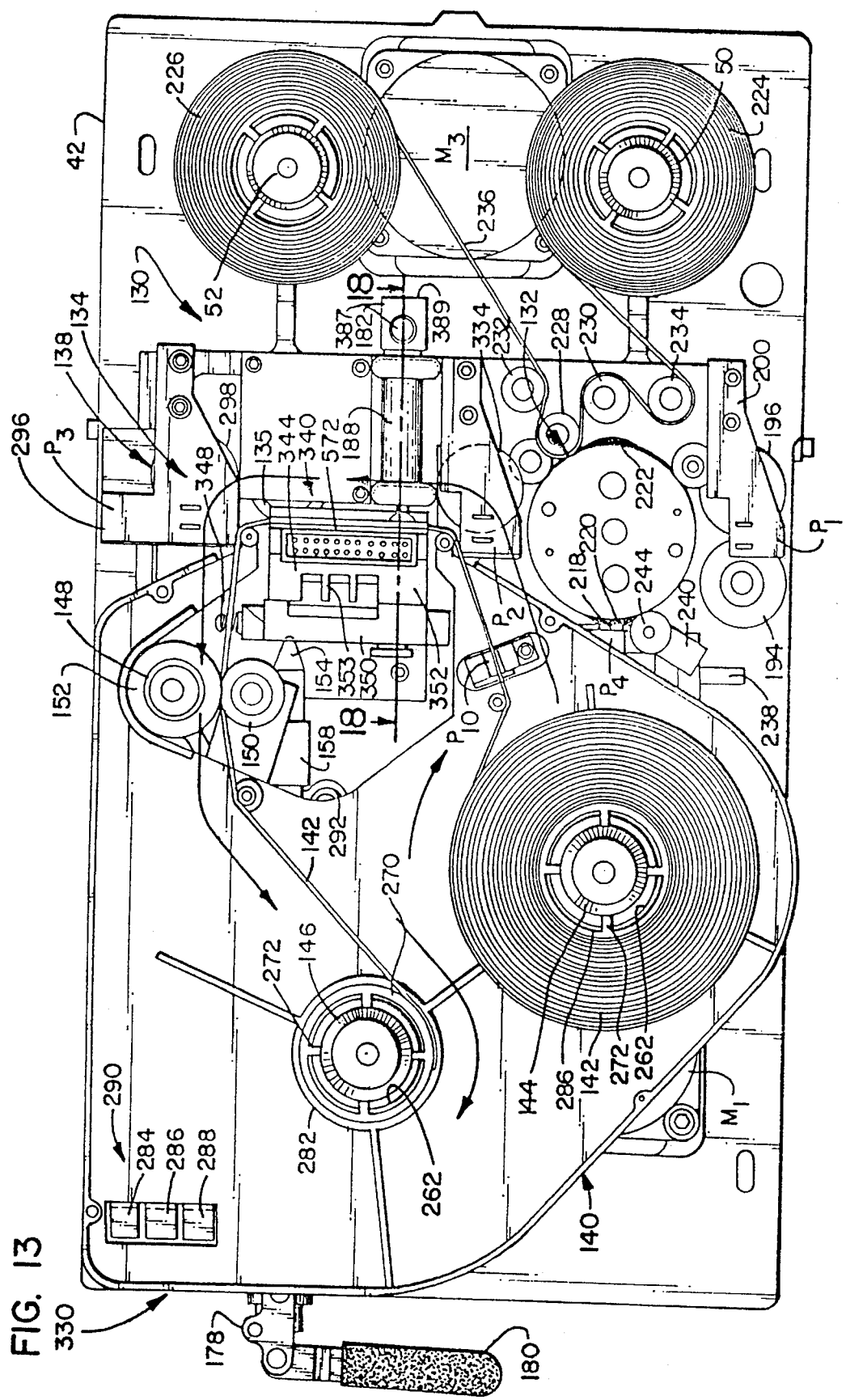
FIG. 13 is a top plan view similar to that illustrated in FIG. 12, with a cartridge illustrated in its operative position, with parts broken away for clarity.
Figure 14:
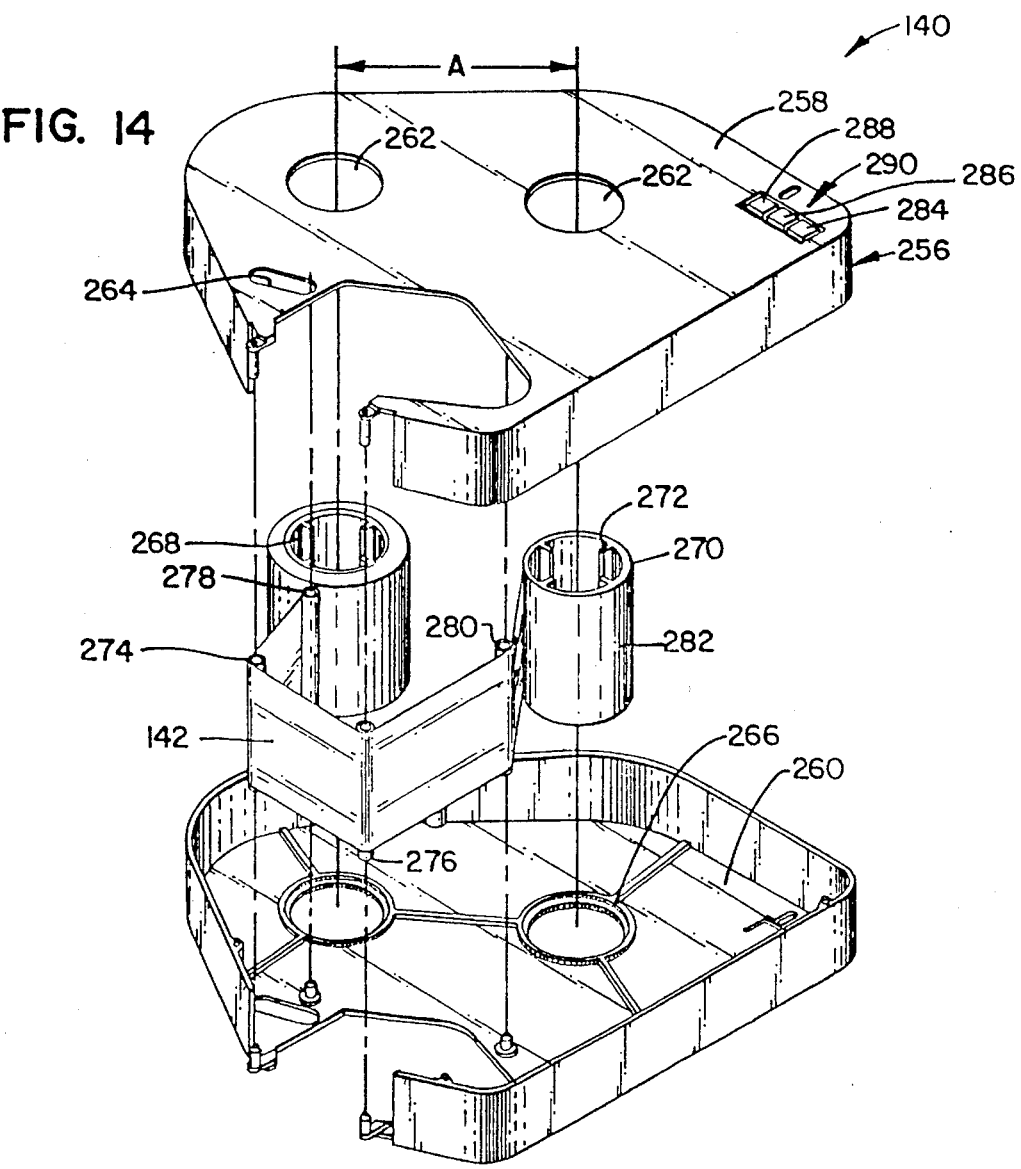
FIG. 14 is an exploded perspective view of a cartridge assembly according to the invention.
Figure 15:
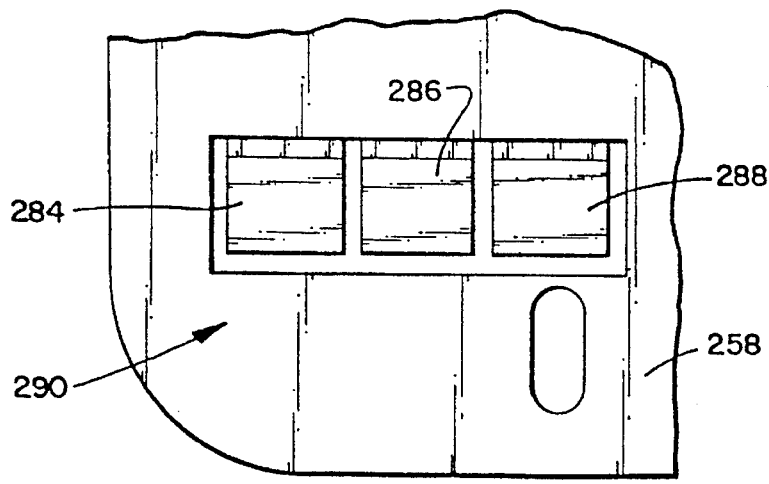
FIG. 15 is a fragmentary view of an indicating system on the cartridge assembly illustrated in FIG. 14.

Referring to FIGS. 13–15, the construction of the printing foil tape cartridge according to the invention will now be described. As shown in the exploded view provided in FIG. 14, cartridge 140 includes a styrene outer casing 256 having an outer surface 258 and an inner surface 260. A pair of circular recesses are provided in both sides of outer casing 256 for receiving the first and second foil drive spindles 144, 146 shown in FIG. 13. Circular recesses 262 are preferably spaced so that their central axes are approximately three and one-half inches apart, as is shown by distance "A" in FIG. 14. A slot 264 is defined in outer casing 256 for receiving a photo detector $P_{10}$, which is best illustrated in FIG. 3. Each side of the inner surface 260 of outer casing 256 have a pair of circular seating surfaces 266 defined therein for receiving first and second cylindrically shaped spool members 268, 270, as is shown in FIG. 14. Each of the spools 268, 270 have an inwardly extending rib 272 which is adapted to engage an outwardly extending projection on the respective foil drive spindles 144, 146. As is shown in FIG. 14, unused printing foil 142 is wrapped around first spool 268 for storage purposes. Preferably, a transparent warning leader is spliced to printing foil 142 on the end of the supply wrapped around spool 268. When the printing foil 142 is nearly exhausted, the transparent leader will pass by photosensor $P^{10}$, which will report the exhaustion of printing foil to the control system, as will be described below.

A first guide post 274 and a second guide post 276 are provided for guiding the printing foil 142 along printing plane which is constructed for positioning between the thermal printing line 374 and print roller 135. A third guide post 278 is provided to guide foil 142 from first spool 268 to the first guide post 274. Likewise, a fourth guide post 280 is provided for guiding foil 142 from the second guide post 276 to the second spool 270, where the used printing foil is stored. As is shown in FIG. 14, all of the guide posts 274, 276, 278, 280 are constructed as thin hollow cylinders which are supported by studs which extend from the inner surface 260 of the outer casing 256.

Referring to FIG. 15, an indicating system for indicating what type of printing foil is contained in a cartridge is illustrated. Indicating system 290 includes a first tab 284, a second tab 286 and a third tab 288 which may be selectively punched out to encode such parameters as the printer energy level which corresponds to a particular type of printing foil. The provision of the three tabs 284, 286, 288 create a total of eight different combinations which may be read either manually or by a corresponding number of photosensors or switches.

Referring to FIG. 5, a switch assembly 322 is illustrated which includes three switches 326 adapted to detect which of the tabs 284, 286, 288 have been punched out of the outer surface 258 of a cartridge assembly 140. Switch assembly 322 is supported by a switch bracket 324 and is arranged to signal the control system as to the type of printing foil 142 contained in the cartridge, so that the appropriate power level or the like may be set automatically by the control system.

Printing foil 142 is preferably constructed of a first carrier layer, a backing layer on the carrier layer for contacting the thermal print line 374 and a pigmentation layer on the side of the carrier layer opposite the backing layer. According to the invention, the carrier layer may be formed of either polyester or polyethylene terephalate. The backing layer is preferably formed of a cross-linked silicon. The pigmentation layer includes a thermal transfer ink of the type which reacts exothermically to heat applied by the thermal print line 375, whereby printing may be effected without melting any portion of the printing foil. A back coated printing foil is sold by Coding Products of Michigan, under the product designation TTR-59CM.

Figure 7:
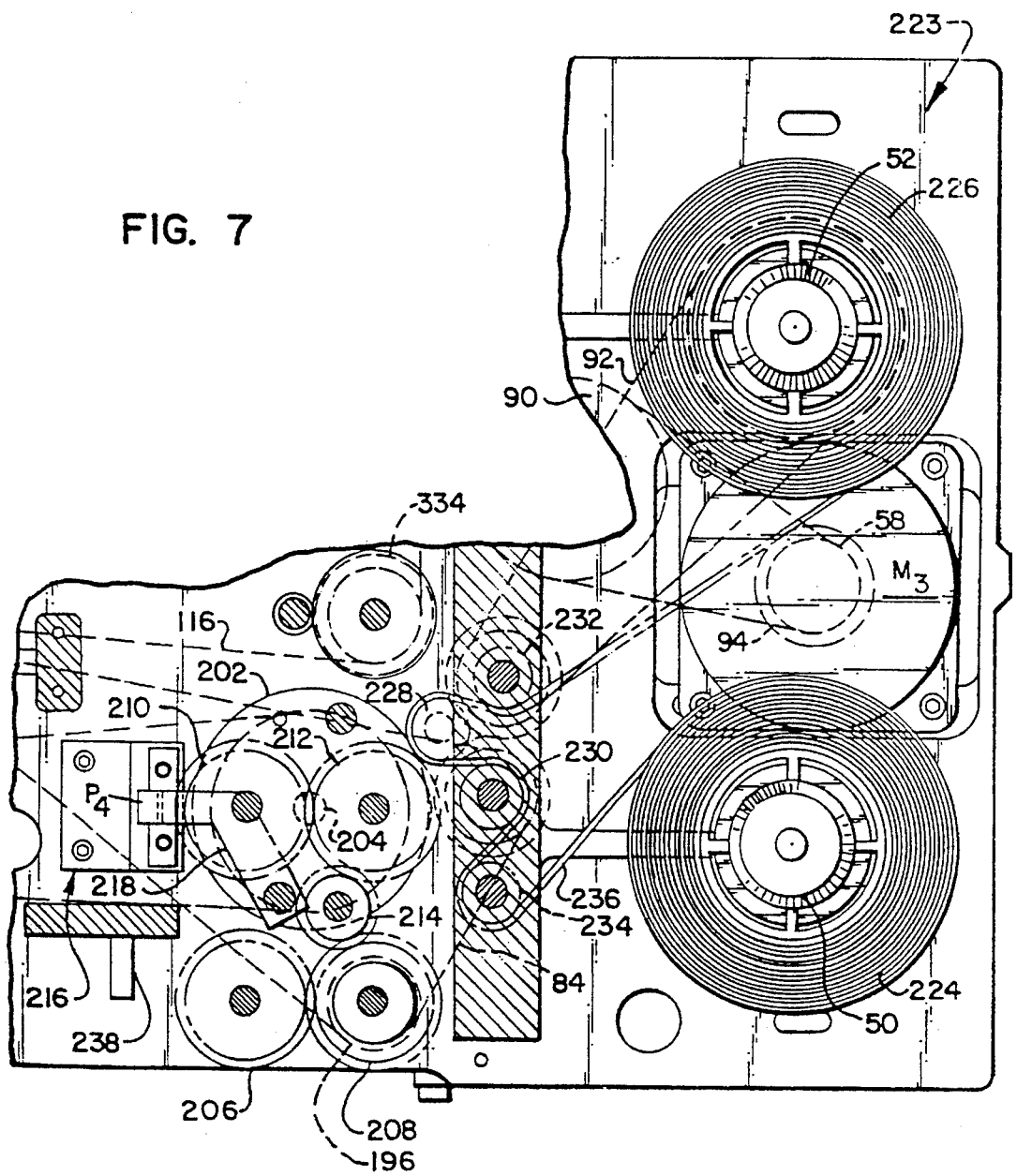
FIG. 7 is a fragmentary top plan view of a portion of the assembly illustrated in FIG. 3, taken in cross-section generally along lines 7—7 in FIG. 6.
Figure 10:
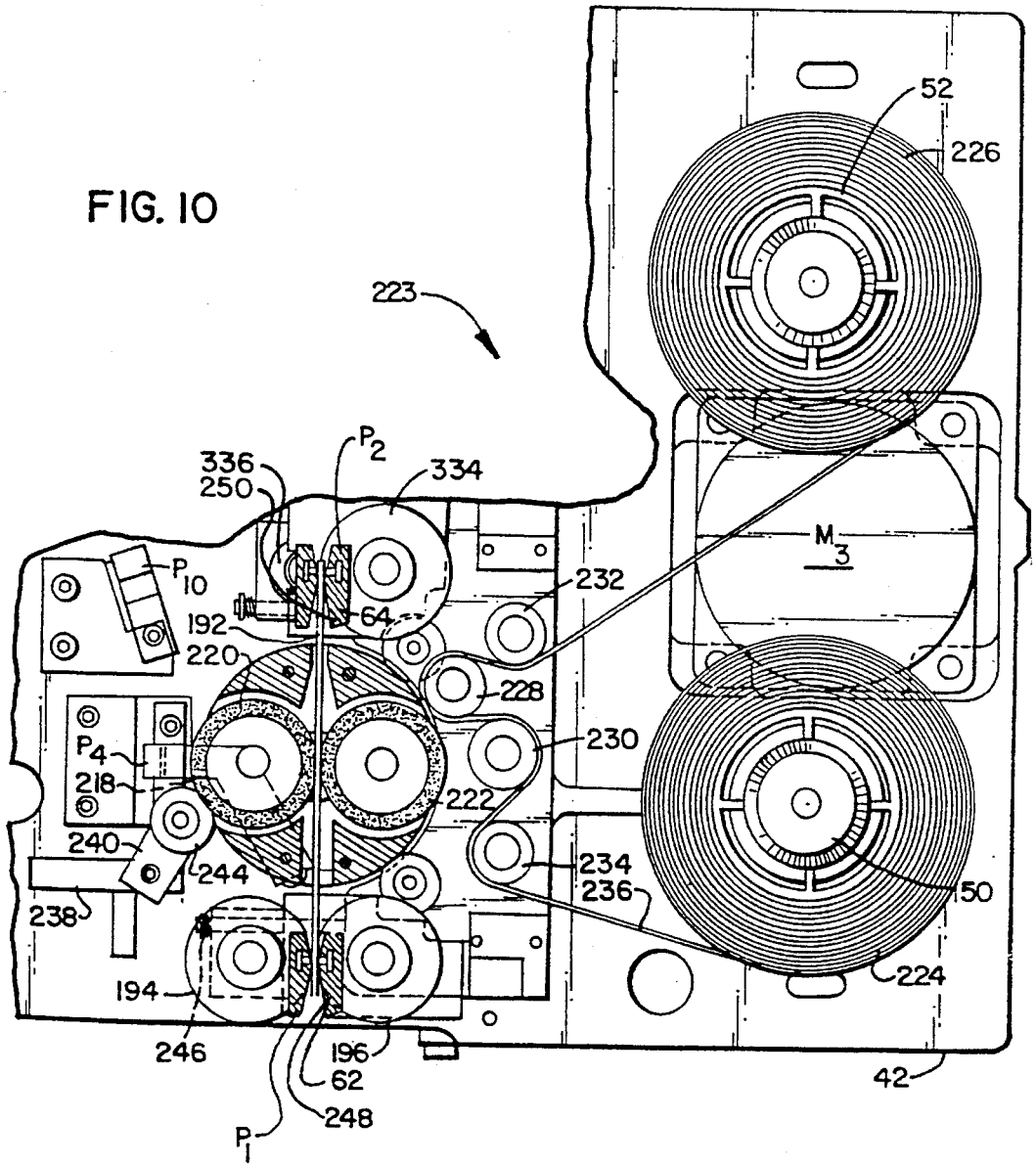
FIG. 10 is a view similar to FIG. 7 and 9, with additional parts broken away for clarity.
Figure 11:
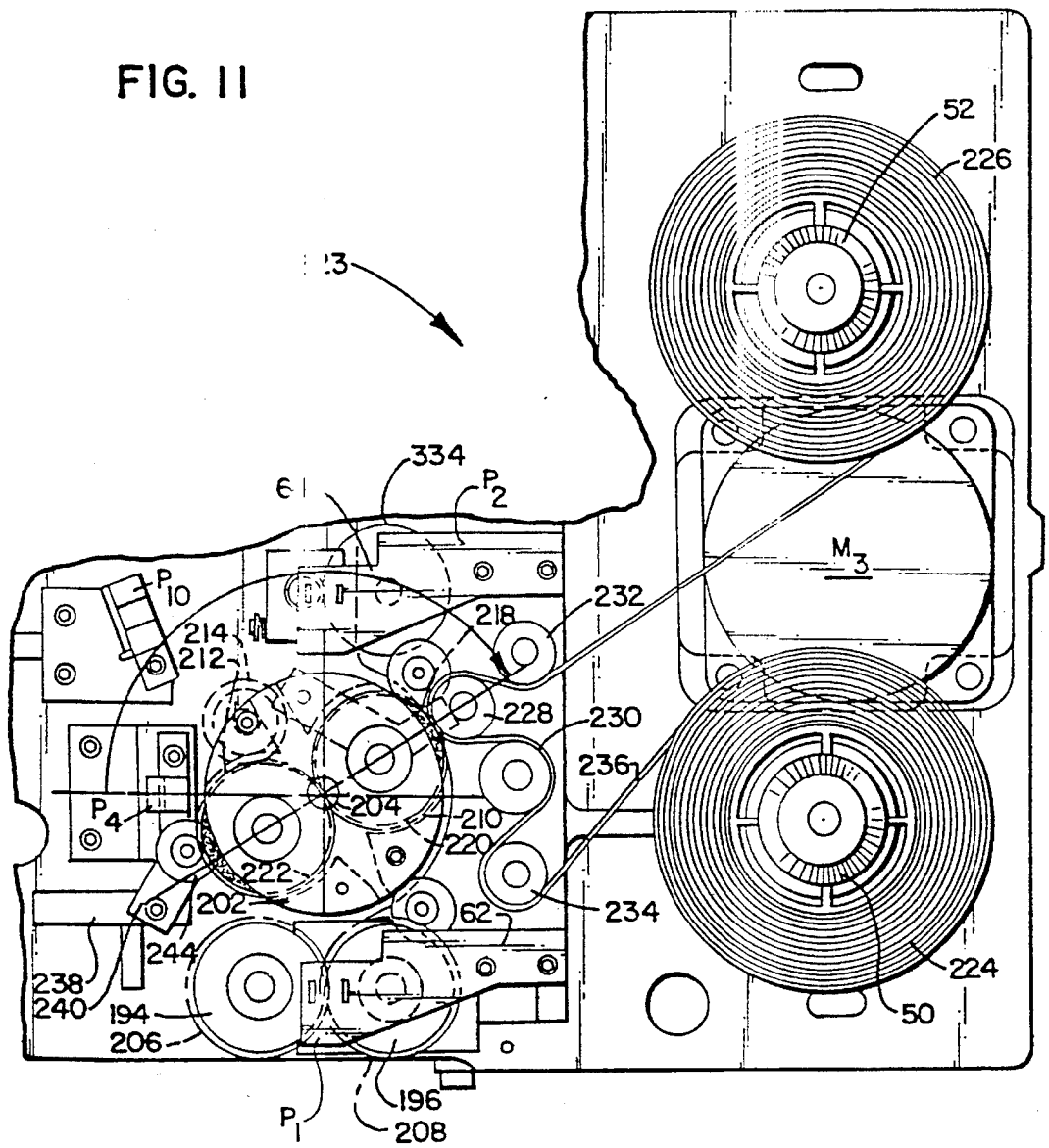
FIG. 11 is a view similar to FIG. 7 and 9, with the stripper assembly shown in a second stripping position.

Referring now to FIGS. 3 and 7, the cleaning unit 132 of graphic station 122 will now be described. As was previously described, a first feed roller 194 and second feed roller 196 are mounted for synchronized rotation beneath a first top edge guide member 68 and are biased toward each by a feed roller biasing spring 246, as is shown in FIG. 10. Second feed roller 196 is rotated by stepper motor $M_2$ through second timing belt 84 and the feed roller input pulley 80. A second gear 208 is mounted to rotate with second feed roller 196 and feed roller input pulley 80 and is intermeshed with a first gear 206 which is in turn mounted for rotation with the first feed roller 194. Accordingly, rotation of the first feed roller 194 is synchronized with the second feed roller 196. Turret body 202 is supported for rotation with a turret body shaft 204 that is connected with turret input pulley 72. As a result, turret body 202 may be rotated by stepper motor $M_2$ as has previously been described.

A first cleaning roller 220 and a second cleaning roller 222 are mounted for rotation on turret body 202, as is shown in FIG. 3. As shown in FIG. 7, third gear 210 is mounted for rotation with first cleaning roller 220, and a fourth gear 212 is likewise mounted for rotation with the second cleaning roller 222. Fourth gear 212 and third gear 210 intermesh so as to ensure synchronization between the first and second cleaning rollers 220, 222. The shafts supporting rollers 194, 196 are mounted in one-way pulley clutch bearings which allow the rollers to turn only in the feed direction, and allow the rollers to be driven in the feed direction at a speed greater than provided by their shaft, so the workpiece will be driven at the speed of the fastest roller. Turret body 202 further supports a transfer gear 214 which intermeshes with both second gear 208 and fourth gear 212 when the turret is in the position illustrated in FIG. 7, which is the normal work feed position. As a result, cleaning rollers 220, 222 will be synchronized with the first and second feed rollers 194, 196 when a card workpiece is being fed through the cleaning unit 132, and share the one-way clutching action described above.

In order to monitor the rotational position of turret body 202, a turret position detector 216 is provided which consists of a turret flag 218 extending radially from the turret body 202 and a photosensor $P_4$ for detecting the position of the turret flag 218. Photosensor $P_4$ is monitored by the control system in a manner that will be described below.

In order to remove particulate matter which has collected on the cleaning rollers 220, 222 during use, a stripper system 223 is provided. Stripper system 223 includes a length of stripper tape 236 which is arranged in a first stripper tape supply reel 224 and a second stripper tape stores reel 226. First stripper tape supply reel 224 is adapted to be non-rotatably received over the first stripper tape spindle 50, and second stripper tape reel 226 is adapted to be non-rotatably received over second stripper tape spindle 52. As has been previously described, a stripper roller 228, a first stripper guide roller 230, a second stripper guide reel 232 and a third stripper guide reel 234 are provided in cleaning unit 132. First stripper guide roller 230 has an outer diameter of 0.500 inches and second stripper guide roller 232 has an outer diameter of 0.510 inches. It is important that the diameter of the second roller be greater than the first roller so that the tension is maintained in the stripping tape during cleaning. As may be seen in FIG. 7, stripper tape 236 is guided from supply reel 224 over the third stripper guide roller 234, back around the first stripper guide roller 230, so that it winds around stripper roller 228, and then curves around second stripper guide roller 232 on its way to the second stripper tape reel 226.

In order to remove particulate matter from a card passing through the cleaning unit 132, cleaning rollers 220, 222 are provided with an adhesive coating and are preferably made from 20 to 30 durometer shore A urethane rubber. As the card passes between the rollers, the debris accumulates on the surface of the rollers and must be removed by the stripper system 223. To effect this, stripper tape 236 has one surface thereof coated with a substance that is more adhesive than the surface of cleaning rollers 220, 222. The adhesive surface of stripper tape 236 is arranged to face away from stripper roller 228, so that it is facing the cleaning rollers 220, 222.

In order to provide stability to the turret body 202 as it is rotated about shaft 204, a plurality of turret support bearings are provided. For example, as may be seen in FIG. 3, a bearing support block 240 is fixably mounted to a structural support 238 and has a turret support bearing 244 rotatably mounted thereon which abuts a circumferential side surface of the turret body 202. In the illustrated embodiment, three such bearings are provided which give great deal of stability to the turret body 202.

Figure 8:
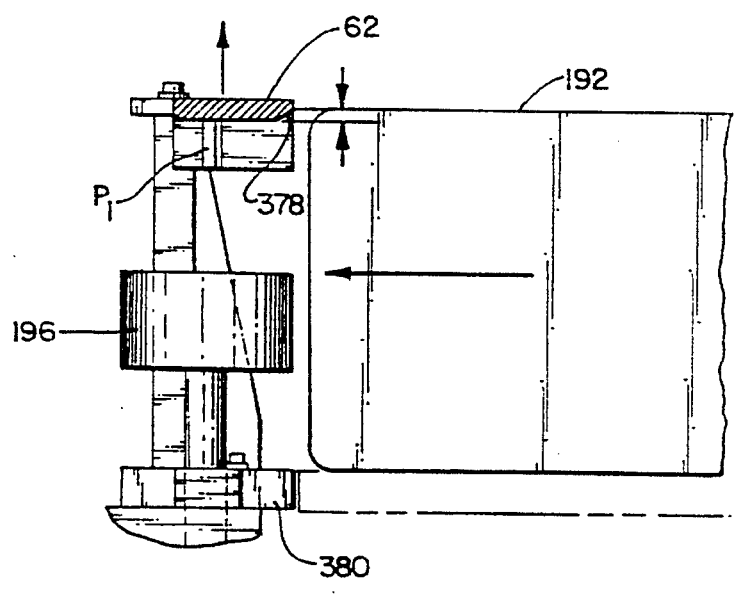
FIG. 8 is a fragmentary cross-sectional view taken along lines 8—8 in FIG. 3.

Referring to FIG. 10, first top card guide 62 includes a pair of ramped slots 248 which center a workpiece card entering the cleaning unit 132. Second top card guide 64 likewise has a ramped top slot 250 provided therein for similar purposes. As may be seen in FIG. 10 photosensors $P_1$ and $P_2$ are built into the first and second top card guides 62, 64, respectively. Referring to FIG. 8, the first top edge guide 62 has a chamfered leading edge 378 which engages the front surface of a workpiece card entering therein. Second and third top edge card guides 64, 68 likewise are provided with a chamfered edge. When a card 192 enters beneath one of the top edge guides 62, 64, 68, the cantilevered arm supporting the top edge guide deflects upwardly, thereby exerting a downward bias onto the card which keeps the card in a proper position. For example, first top edge guide 62 exerts a downward bias onto card 192 which presses the card firmly onto bottom edge guide 380, as is shown in FIG. 8.

Figure 22:
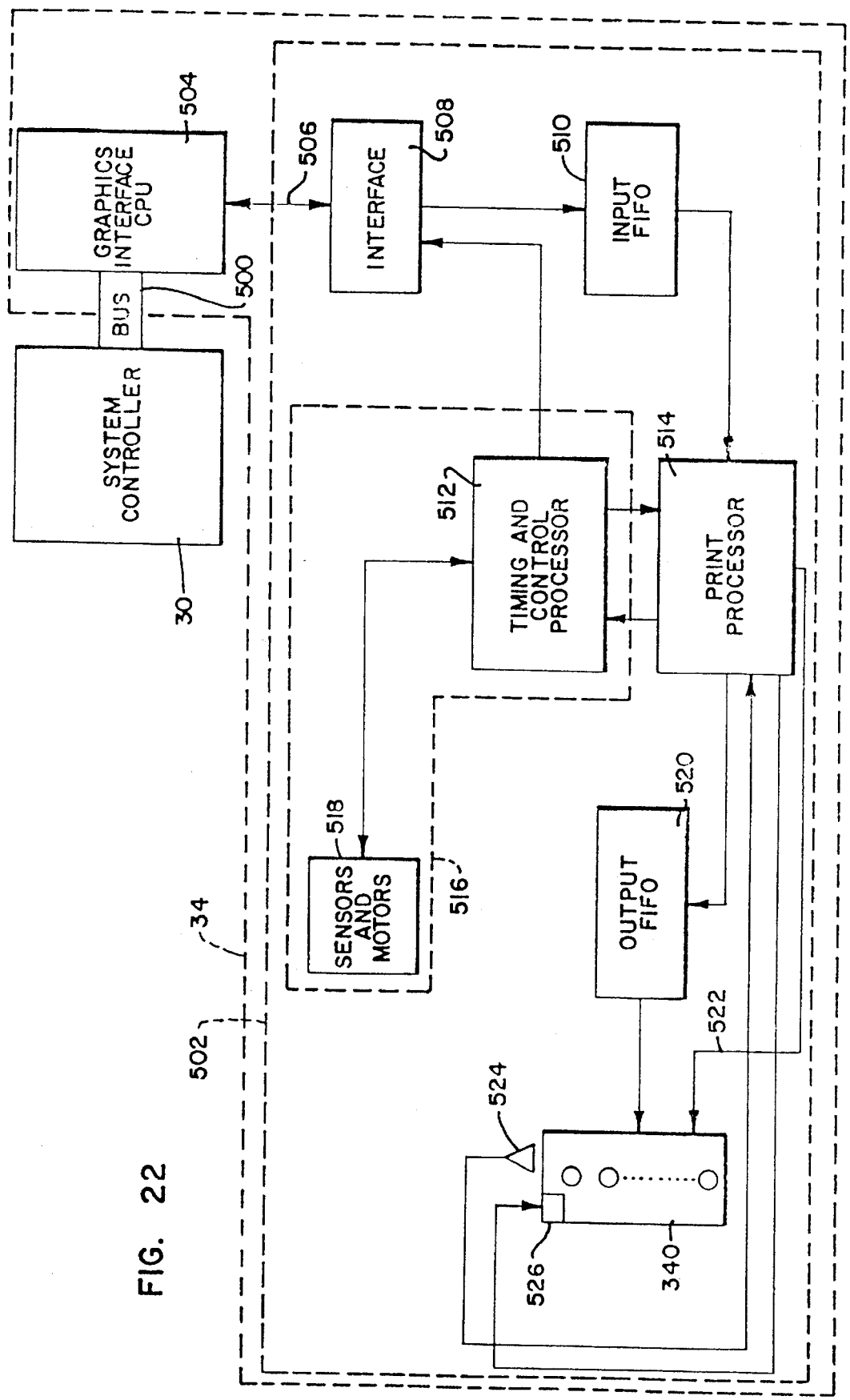
FIG. 22 is a detailed schematic block-type diagram of a portion of the control system illustrated in FIG. 2 for controlling the graphic station illustrated in FIG. 3.

Referring to FIGS. 2 and 22–26, the control system for graphic station 22 will now be described. As is shown in FIG. 22, system controller 30 communicates with a print engine 502 via a communications bus 500. Print engine 502 includes the above-described print head structure including printing head 340 and the above-discussed drive electronics 366. Print engine 502 of the preferred embodiment applies card image data to the plastic cards through the use of fixed array thermal transfer technology. The print engine 502 is equipped with a custom thermal print head 340, as described above, providing a single "column" 374 of dot or thermal print elements 376 which are vertically oriented with respect to the printing surface. The dots 376 are resistive elements that, when turned on, heat up a foil and transfer ink from a carrier coating. The dot elements remain off at areas left blank. Each dot element is controlled by a binary digit supplied to the print head 340, wherein a binary "1" means the corresponding dot element 376 is turned on and binary "0" means the corresponding dot element is turned "off".

The thermal print head 340 is the most vulnerable component in the print engine 502, so steps which increase the life span of the print head 340 increase the cost effectiveness of the print engine 502. The goals of the present invention, therefore, are to (1) optimize print quality and consistency while (2) minimizing the electric and thermal stress on the print head 340.

Figure 23:
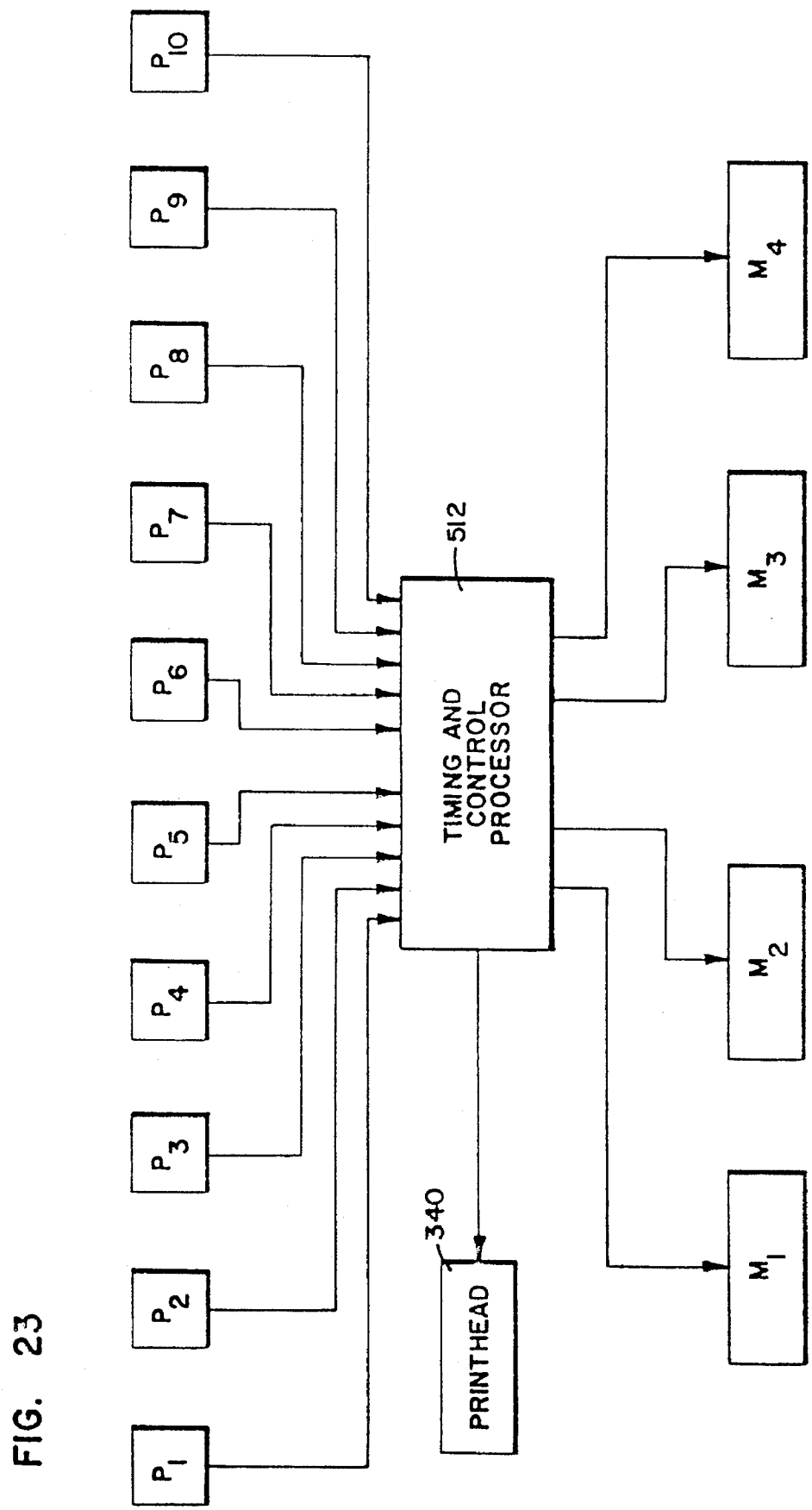
FIG. 23 is a schematic block-type diagram detailing a portion of the control system illustrated in FIG. 22.
Figure 24:
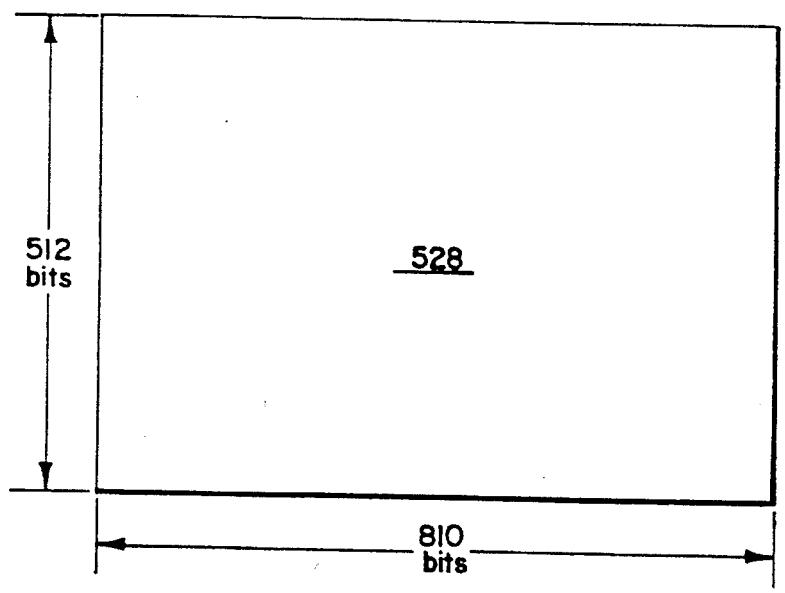
FIG. 24 is a depiction of a card image buffer according to the control system of the invention.

FIG. 22 is an overall schematic depiction of the print engine 502, along with system controller 30 and graphics control CPU or card 34. Cards are delivered to the print engine 502 by the upstream cleaning unit 132. The card is first moved to the print position by the feed rollers 334, 336 and during printing the card is moved by the print roller 135, as is described above. Upon completion, the card is moved out of the print engine 502 by the feed rollers. The progress of the card through the system is monitored by sensors $P_1$, $P_2$ and $P_3$, as is represented in FIG. 23. The print head 340 is brought into contact with the plastic card at the column dictated by a "starting column" value sent by the system controller 30. The card image is printed until the "ending column" value is reached, which value is also transmitted from the system controller. The starting column and ending column quantities have default values of column No. 1 and No. 810, respectively. FIG. 24 depicts a card image 528. A column consists of 512 bits numbered 0–511, wherein bit 0 represents the lower left corner of the image and bit 511 represents the upper let corner of the image. A row consists of 810 columns numbered 0–809, wherein column 0 begins on the left side of the card image buffer 528.

A graphics interface CPU 504 converses directly with the system controller 30 when the system controller 30 wishes to print a card image. The graphics interface CPU 504 stores the card image in a RAM buffer, and converses with the print engine 502 via cable 506 and an interface 508. The interface 508 delivers data and commands from the system controller 30 to the print engine 502. The interface 508 is concerned with five elements: the transfer request message; the transfer acknowledge message; input FIFO 510 buffer selection; a write strobe; and an 8-bit parallel data interface. The transfer request message is sent by the print engine 502 to the graphics interface CPU 504 to request the current column of data and the previous three columns of data. The graphics interface CPU 504 responds with the data and a transfer acknowledge message. The interface 508 is responsible for loading the input FIFO 510 properly. This requires that the first 256 bits of each column of data be written to the first buffer in the input FIFO 510. Next, the interface 508 de-selects the first buffer, selects the second buffer, and transmits the remaining 256 bits of each column of data into the input FIFO 510. This is repeated for each column of data. The write strobe signal strobes the 8-bit parallel data into the chosen input FIFO 510 buffer.

The print head 340 is driven by two separate buffers in an output FIFO 520. Each buffer is loaded separately and serially by the print processor 514 which reads the data from the input FIFO 510. In terms of card progress through the system, the print engine 502 waits until the card has reached sensor $P_2$ and then requests three consecutive columns from the graphics interface CPU 504. This action buffers data in the input FIFO 510 and the output FIFO 520. The timing and control processor 512 is responsible for synchronizing the print head 340 with the cards position, based upon the sensor and stepper motor signals 518. The sensor and stepper motor signals 518 first indicate that the card is positioned at the print head 340. The timing an control processor 512 monitors subsequent signals 518 indicating each column advance of the card, and interrupts the print processor 514 which activates the print head strobe 522 accordingly. Once card printing begins, subsequent data is requested on a column-by-column basis from the graphics interface CPU 504. The interface 508 is responsible for keeping pace with the printing process. As mentioned herein earlier, during the printing of a card image, each column requires that the three previous columns of data, as well as the current column of data, be sent to the print engine 502. The print processor 514 uses this historical data to provide thermal hysteresis control for each dot element in the print head 340. The past history of each dot element for the previous print cycles is used to calculate the exact energy necessary to raise the dot element temperature to the ideal printing temperature. The energy supplied to the print head 340 is controlled by dividing the print head strobe 522 into five mini-phases. These five mini-phases are: 1) the transparent phase; 2) three compensation phases; and 3) the preheat phase. The Boolean algebra that describes the logic for determining when a mini-phase is "on" is in the lower portion of FIG. 26, generally identified by reference numeral 550. The transparent phase is the first data loaded into the print head 340 by the print processor 514 and the longest print head strobe 522 by the print processor 514. This data, loaded into the output FIFO 520, is the current column of data read from the input FIFO 510. The compensation phases are of equal time duration and yield active dot elements within the print head 340 depending upon the past history of each dot element. Whether a dot element is turned "on" during a compensation phase depends on whether the transparent phase is "on" for the current column and whether the dot element was "off" during he previous columns printed. The dot element is turned "on" for the first compensation phase if it was "off" during the first prior column (i.e., one column earlier). The dot element is turned "on" for the second compensation phase if it was "off" during the first and second prior columns (i.e., one and two columns earlier). The dot element is turned "on" for the third compensation phase if it was "off" during the first, second, and third prior columns (i.e., one, two, and three columns earlier).

The preheat phase is used to reduce the differential temperature stress on a dot element. The preheat phase occurs if a dot element is "off" for the entire hysteresis (i.e., if the dot element is "off" in the current column and it was "off" during all three prior columns). A preheat phase is required because the transfer temperature of the foils utilized in the preferred embodiment are higher than the typical thermal media. This higher transfer temperature, coupled with the need to eliminate density variations as a function of ambient temperature, dictates the need for methods of preheating dot elements in the print head 340 to further reduce the differential temperature stress. Preheating dot elements in the print head 340 also reduces the need to vary the applied energy within the print pulse as a function of the ambient temperature, as discussed herein later.

Figure 26:
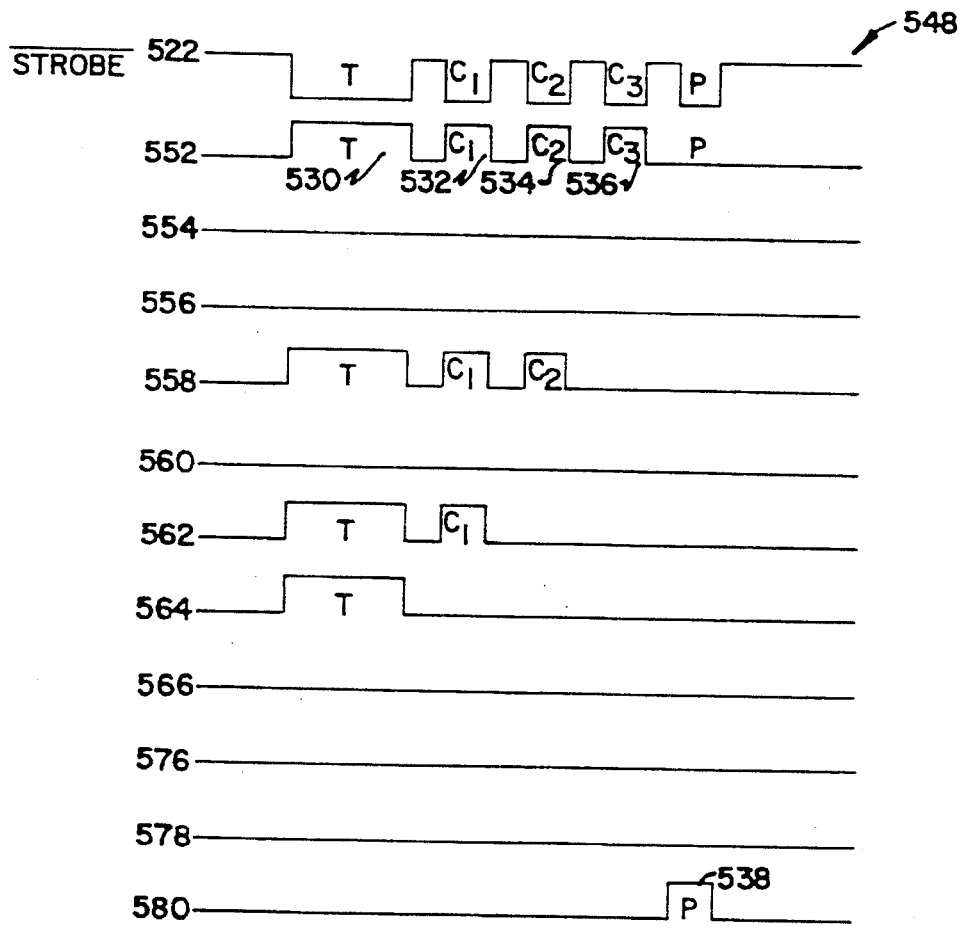
FIG. 26 is a representative depiction of the logic used by the print processor of the invention.

FIG. 26 provides an example of the logic used by a print processor 514 to determine how many mini-phases should be generated. At the top of FIG. 26 is an example "past history" for a dot element, generally identified by reference numeral 546. Beginning on the left side of the diagram, the printer begins from a cold start. For the next 11 print cycles after a cold start, the example dot element is "on" for one cycle, "off" for two cycles, "on" for one cycle, "off" for one cycle, "on" for two cycles, and "off" for four cycles.

Underneath each cycle indicator of "on" or "off" is a reference numeral, 552–566 and 576–580. These reference numerals correspond to the timing diagrams in FIG. 26, generally identified by reference numeral 548. The first timing diagram illustrates the print head strobe 522, which is an inverted signal. The following timing diagrams illustrate the mini-phases for each print cycle.

In timing diagram 552, the first print cycle after a cold start, the current column is "on" resulting in an active transparent phase 530. Because there are no prior columns of data to be used in determining how many mini-phases should be generated, three "initialization" columns are transferred by the graphics interface CPU 504, wherein each column consists of all "off" dot elements Therefore, the transparent phase 530 is concatenated with compensation phases 532, 534 and 536.

In timing diagram 554, the second print cycle after a cold start; the current column is "off" resulting in an off transparent phase 530. Compensation phases 532, 534 and 536 are "off" because the transparent phase 530 is "off". The preheat phase 538 is "off" because the first prior column was "on".

In timing diagram 556, the third print cycle after a cold start, the current column is "off" resulting in an "off" transparent phase 530. Compensation phases 532, 534 and 536 are "off" because the transparent phase 530 is off. The preheat phase 538 is "off" because the second prior column was "on".

In timing diagram 558, the fourth print cycle after a cold start, the current column is "on" resulting in an active transparent phase 530. Compensation phases 532 and 534 are "on" because the first and second prior columns were "off". The preheat phase 538 is "off" because the current column is "on" and the third prior column was "on".

In timing diagram 560, the fifth print cycle after a cold start, the current column is "off" resulting an "off" transparent phase 530. Compensation phases 532, 534 and 536 are "off" because the transparent phase 530 is "off". The preheat phase 538 is "off" because the first prior column was "on".

In timing diagram 562, the sixth print cycle after a cold start, the current column "on" resulting in an active transparent phase 530. Compensation phase 532 is "on" because the current column is "on" and the first prior column was "off". The preheat phase 538 is "off" because the current column is "on" and the second prior column was "on".

In timing diagram 564, the seventh print cycle after a cold start, the current column is "on" resulting an active transparent phase 530. Compensation phases 532, 534 and 536 are "off" because the first and third prior columns were "on". The preheat phase 538 is "off" because the current column is "on" and the first and third prior columns were "on".

In timing diagrams 566, 576, 578 and 580, the eighth through eleventh print cycles after a cold start, all current columns are "off" resulting in an off transparent phase 530. Compensation phases 532, 534 and 536 are "off" because the transparent phase 530 is off. In timing diagram 580, the preheat phase 538 is "on" because the current column is "off" and all three prior columns were "off".

The print processor 514 is responsible for controlling the width of each print head strobe 522. Whenever one to three additional mini-phases are concatenated to the first mini-phase, based upon the past print history as described above, the concatenation results in very high electrical duty cycles. The print rate cannot be reduced to maintain a constant duty cycle in the face of dynamically changing individual pulse widths. The worse case can occur with a "cold dot" (i.e., a dot which has been "off" for the four print cycles of the hysteresis algorithm) where the transparent phase plus all three compensation phases are concatenated together to produce the print pulse. The danger is that the "cold dot" can create a peak dot temperature because of the dramatic increase in the duty cycle, which results from the mini-phase concatenation within a fixed overall print rate. The problem is exacerbated in the preferred embodiment because the high temperature transfer characteristics of the foil require higher energy than standard thermal media.

To overcome this problem, the invention allows the duty cycle, or pulse width, of individual mini-phases to be established and varied by the timing and control processor 512. The pulse width is initially determined by the thermal transfer characteristic of the foil being used. In an alternative embodiment, a foil type signal characterizing the thermal transfer temperature of the foil being used is input to the print processor 518. In an alternative embodiment, the foil type signal is used in conjunction with the thermistor 524 voltage to index into an extended look-up table. Different foils would have different thermal transfer characteristics requiring different energy levels. For example, different ink color will typically result in a foil having a different thermal transfer temperature. During printing, the temperature of the print head 340 is continuously monitored by the print processor 514 using thermistor 524. Thermistor 524 produces a voltage which varies with the temperature of print head 340. The print processor 514 uses the voltage in a compensation algorithm, indexing into a look-up table to retrieve values indicating the desired width of the print head strobe 522. The look-up table is created on the basis of empirical evidence. As a result, the print head strobes 522 associated with the mini-phases discussed above are adjusted by the print processor 514. Thus, the required foil transfer temperature can be reached while avoiding dangerously high peak temperatures by effectively integrating or time-multiplexing the power applied to the print head 340.

The print processor 514 computes all five mini-phases for the next column during the printing of the present column. The significance of this approach is that it decouples the minimum width of a mini-phase from the execution time required to generate a mini-phase. This is especially important given hat the cycle time for a mini-phase is shortened at high temperatures, to the point where the cycle time can be less than the execution time for computing the mini-phase.

Figure 25:
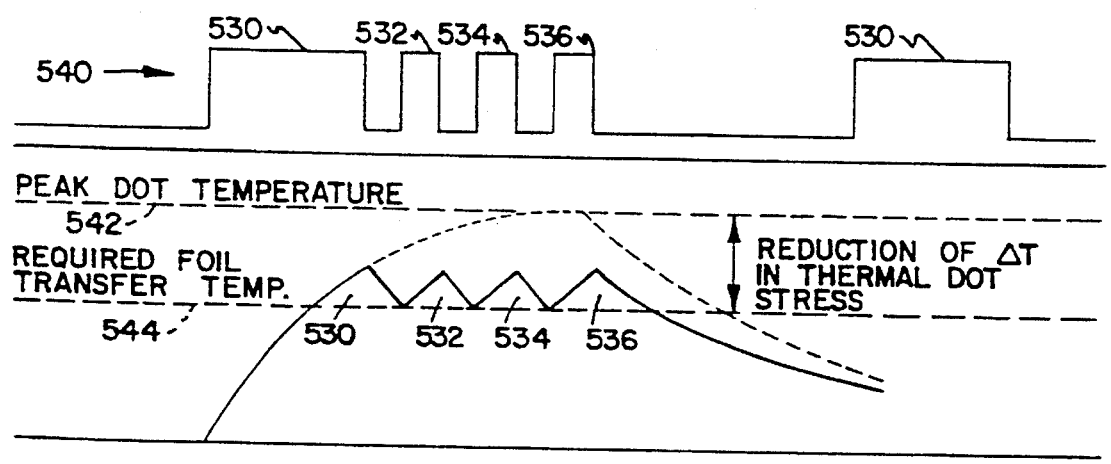
FIG. 25 is a temperature response diagram according to the control system of the invention.

The temperature response of each dot element due to the mini-phases is illustrated in FIG. 25 by the four pulses, generally referred to by reference numeral 540. Pulse 530, associated with the transparent phase, miss the dot element temperature above the required foil transfer temperature 544. However, pulse 530 does not provide enough energy to raise the dot element temperature above the peak dot temperature 542. When pulse 530 ends, the temperature of the dot element begins to drop. After a predetermined amount of time, pulses 532, 534 and 536 associated with the three compensation phases, are generated to keep the dot element temperature from falling below the required foil transfer temperature 544 or from rising above the peak dot temperature 542. In this way, the invention maintains the temperature of the dot element above the required foil transfer temperature 544, but below the peak dot temperature 542, thereby optimizing print quality but minimizing thermal stress. Although not shown in FIG. 25, the width of the preheat pulse 538, can also very as a function of the print head 340 substrate temperature. Thus, during printing, the print processor 514 is able to uniquely establish the appropriate print pulse for each individual dot.

The final factor used in controlling print quality in thermal stress is preheating the print head 340. The resistance of the print head 340 to variations in the ambient temperature can be accomplished through the use of self-regulating thermistor heaters 526 which are mounted to the print head heat sink and spaced so as to provide even heat distribution. The print processor 514 receives signals from thermistor 524 indicating the substrate temperature of the print head 340, and, in turn, generates signals to the thermistor heaters 526 in an attempt to maintain the print head 340 at a constant optimal temperature. As a result, print head 340 is physically preheated to a constant background temperature, which allows the invention to operate in a more stable overall environment.

The system for controlling the various mechanical elements of cleaning unit 132 and printing unit 130 will now be described. As a card is introduced to cleaning unit 132 from a previous station such as the magnetic stripping station 20, photocell sensor $P_1$ reports the entry of the card to timing and control processor 512, which, in turn, informs system controller 30 via interface 508, cable 506, the graphics interface CPU 504 and communications bus 500. Timing and control processor 512 then instructs stepper motor $M_1$ to turn first and second feed rollers 194, 196 in order to feed the card through the first and second cleaning rollers 220, 222, which are rotated in synchronization with rollers 194, 196 in a manner described above. At this timer timing and control processor 512 and system controller 30 monitor the status of photocell sensor $P_4$ to verify that cleaning turret body 202 is in its home position. As the card is advanced through the cleaning station, timing and control processor 512 continues to monitor the status of photocell sensor $P_1$. If timing and control processor 512 determines that $P_1$ remains blocked for too long a time given the rotation of feed rollers 194 196, the timing and control processor 512 will determine that the passage of the card has been blocked, which is a fatal error. In the case of a fatal error, timing and control processor 512 reports back to system controller 30, which ceases operation of the entire card producing system 10.

Figure 9:
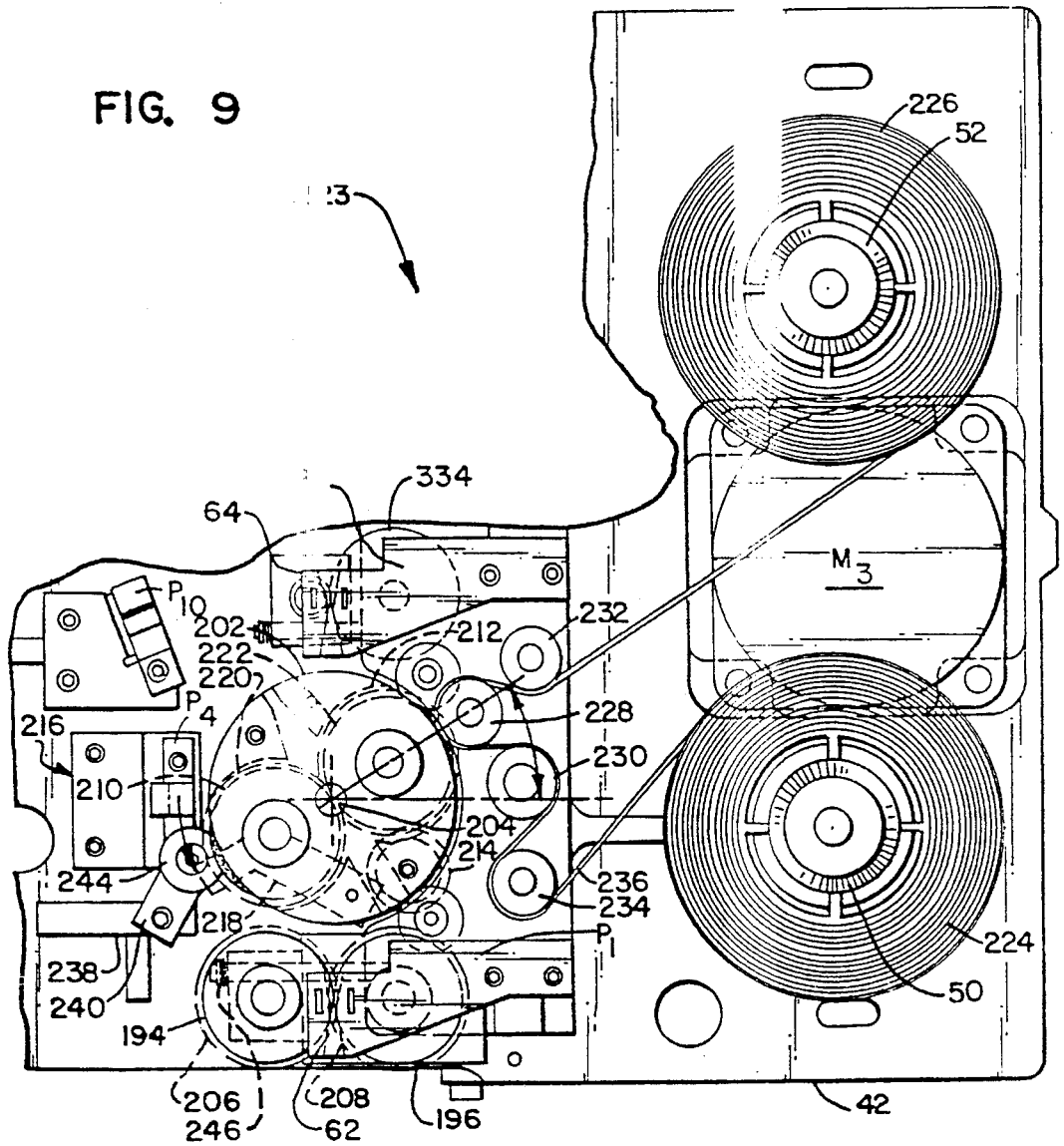
FIG. 9 is a view similar to FIG. 7 showing the stripper assembly of the invention in operation.

As the card continues to advance through the cleaning station, photocell sensor $P_2$ is monitored by timing and control processor 512, which instructs stepper motor $M_1$ to advance the card to an initial printing position responsive to signals received from $P_2$. At the time photocell sensor $P_2$ is no longer blocked by the card, timing and control processor 512 records passage of the card through the cleaning station. Timing and control processor 512 keeps count of the number of cards which have passed through the cleaning system since the occurrence of the last cleaning sequence. The cleaning event is triggered by the processed card count and this is estimated to be between 20 and 1000 cards, depending upon the anticipated cleanliness of the cards. At the time the processed card count reaches its predetermined limit, timing and control processor 512 instructs stepper motor $M_2$ to rotate the cleaning turret 202 by 30 degrees in a counter-clockwise direction as viewed from the top of the turret body 202. FIG. 9 depicts turret body 202 in this position. This places the cleaning roller 222 in position to be cleaned by the stripper tape. At this time, the stepper motor $M_1$ is instructed to reverse in direction by timing and control processor 512 to run for a 720 degree rotation. This action drives the stripper tape past the cleaning roller 222 and removes particulate matter from cleaning roller 222. After this is completed, stepper motor $M_2$ is instructed by timing and control processor 512 to drive the turret body 202 330 degrees in the counterclockwise direction, which returns the turret body 202 to its home position. Timing and control processor 512 further monitors photocell sensor $P_4$ to verify that turret body 202 has indeed returned to the home position. At this time, timing and control processor 512 instructs stepper motor $M_1$ to feed another card through the cleaning rollers 220, 222. After this next card has been passed through photocell sensor $P_2$, timing and control processor 512 instructs stepper $M_2$ to rotate turret body 202 150 degrees in the clockwise direction, which places cleaning roller 220 in a position to have particulate matter removed therefrom. Timing and control processor 512 then instructs stepper motor $M_1$ to reverse direction and run for a 720 degree rotation, which drives the stripper tape past first cleaning roller 220. After this is completed, timing and control processor 512 causes stepper motor $M_2$ to rotate the turret 150 degrees in a counterclockwise direction, which returns turret body 202 to its home position. When timing and control processor 512 learns through photocell sensor $P_4$ that turret body 202 has returned to the home position, stepper motor $M_1$ is hen instructed to drive a new series of cards through cleaning rollers 220, 222.

As a card is moved into printing position, timing and control processor 512 checks photocell sensor $P_{10}$ to verify that printing foil is available. If printing sensor $P_{10}$ indicates that printing foil has been exhausted, timing and control processor reports back to system controller 30, which ceases operation of the entire card producing system 10 until which time timing and control processor 512 reports that the supply of printing foil has replenished.

Assuming sensor $P_{10}$ indicates that printing foil is available, timing and control processor 512 instructs stepper motor $M_3$ to rotate cam shaft 182 in the manner described above, to cause the thermal print head and printing line 374 to be biased against printing roller 133 by the compression type compression spring 166 and plunges 154. At this time, timing and control processor 512 monitors the cam shaft position photocell sensor $P_8$ to verify that cam shaft 182 has indeed moved off of its home position. Timing and control processor 512 then instructs stepper motor $M_4$ to drive the first and second foil printer spindles 144, 146 and the printer roller 135. At this time, timing and control processor 512 instructs print process 514 to begin the print algorithm in the manner described above. Timing and control processor 512 simultaneously monitors the movement sensor $P_6$ which is connected to first foil drive spindle 144 in order to verify that printing foil is indeed being fed. If motion sensor $P_6$ indicates that the first printer foil spindle 144 is not, in fact, moving during the printing process, timing and control processor 512 instructs system controller 30 that a fatal error has occurred, and the entire card producing system 10 is shut down. Timing and control processor 512 further monitors the toggle position photocell sensor $P_5$ during the entire printing process to ensure that plunger 154 is properly engaged against the pivot plate 344. If sensor $P_5$ indicates that the toggle mechanism is not properly positioned, timing and control processor 512 reports this back to system controller 30 which shuts down operation of the entire card producing system until which time timing and control processor 512 indicates to system controller 30 that the toggle mechanism is properly positioned.

When printing is completed, timing and control processor 512 instructs stepper motor $M_4$ to advance an additional 0.2 inches of printing foil to make sure that the printing foil separates from the card, and instructs stepper motor $M_3$ to advance cam shaft 182 to its home position. The cam shaft photosensor flag $P_8$ is monitored by timing and control processor 512 to verify that cam shaft 182 has indeed returned to its home position.

In addition, photosensor $P_3$ is monitored by timing and control processor 512 during the printing process to verify that it has been blocked by the card at the proper time during printing. If photocell sensor $P_3$ does not so indicate, timing and control processor 512 assumes that jamming has occurred, and reports a fatal error back to the system controller 30, which shuts down operation of the entire card producing system 10. After printing the card, the timing and control processor 512 instructs $M_2$ to drive the card from the printer roller 135 through second print feed roller pair 138. As the card clears $P_3$, the processor notifies system controller 30 that processing of the card has been completed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A magnetically encoded plastic card production system, comprising:
    (a) supplying means for supplying a series of blank plastic cards;
    (b) encoding means, operatively coupled to the supply means, for encoding a magnetic strip on each card;
    (c) separating means, operatively coupled following the encoding means, having a roller surface for adhesively attracting loose particles from a surface of each card;
    (d) design placing means, operatively coupled immediately following the separating means, for placing a graphic design on each card such that the loose particles are separated from each card subsequent to encoding the magnetic strip on each card and prior to placing the graphic design on each card; and
    (e) collecting means, operatively coupled to the design placing means, for collecting each card after each card has passed through said encoding means, said separating means, and said design placing means.

2. The card production system of claim 1 further comprising a central system controller means for controlling operations of said encoding means, said separating means, and said design placing means.

3. The card production system of claim 1 further comprising embossing means, operatively coupled to the design placing, for embossing alphanumeric characters on each card after said design placing means places the graphic design.

4. The card production system of claim 1 wherein said design placing means comprises:
    (d) (i) feeding means for feeding each card along a work feed path;
    (d) (ii) printing means, positionable adjacent the work feed path, for printing a predetermined pattern as the graphic design on each card; and
    (d) (iii) aligning means for precisely aligning said printing means with respect to said feeding means so that said printing means is adapted to bear against each card at a constant pressure.

5. The card production system of claim 1 wherein said separating means comprises:
    (c)(i) cleaning means for collecting loose particles from each card through the use of at least one engaging surface adapted for engaging a particular surface of each card to be cleaned, the at least one engaging surface having means for attracting loose particles from the particular surface of each card to be cleaned, the feeding means being adapted for feeding each card from said supplying means to said cleaning means along the work feed path; and (c)(ii) removing means for removing collected particles from said cleaning means.

6. The card production system of claim 4 wherein said feeding means comprises a first pair of printer feed rollers; a second pair of printer feed rollers aligned with the said first pair of printer feed rollers along the work feed path; and means for driving said first and second pairs of printer feed rollers.

7. The card production system of claim 4 wherein said printing means comprises a resistance type thermal printer.

8. The card production system of claim 7 wherein said thermal printer comprises a print head element, positionable adjacent the work feed path, which has a thermal print line thereon facing the work feed path, said thermal printer further comprising foil feeding means for feeding a thermal printing foil between said thermal print line and the work feed path.

9. The card production system of claim 8 wherein said thermal printing foil has a first carrier layer, a backing layer on said carrier layer for contacting said thermal print line and a pigmentation layer on the side of said carrier layer opposite said backing layer.

10. The card production system of claim 9 wherein said pigmentation layer includes a thermal transfer ink of the type which reacts exothermically to heat applied by said thermal print line, whereby printing the predetermined pattern may be effected without melting any portion of said printing foil.

11. The card production system of claim 8 wherein said thermal print line has a multiplicity of resistive elements therein which are selectively actuatable to print the predetermined pattern as the graphic design on each card.

12. The card production system of claim 8 wherein said foil feeding means comprises foil supplying means for supplying said thermal printing foil; foil storing means for storing said foil after use; and means for guiding said foil from said foil supplying means to a path between said thermal print line and the work feed path and into said foil storing means.

13. The card production system of claim 12 wherein said foil feeding means further comprises cassette means for housing and supplying said foil supplying means and said foil storing means.

14. The card production system of claim 5 wherein said cleaning means comprises at least one cleaning roller having an outer surface for engaging the surface of each card to be cleaned.

15. The card production system of claim 14 further comprising means for driving said at least one cleaning roller, thereby aiding propulsion of each card along the work feed path.

16. The card production system of claim 14 wherein said removing means comprises a stripping element having stripping means thereon for stripping particles from said at least one cleaning roller, and means for selectively causing engagement between said at leas one cleaning roller and said stripping means.

17. A method for producing magnetically encoded plastic cards, comprising the steps of:

(a) supplying a series of blank plastic cards having an encodable magnetic strip;

(b) encoding the encodable magnetic strip on each card;

(c) adhesively attracting, following the encoding step, loose particles from a surface of each card;

(d) placing, immediately following the attracting step, a graphic design on each card such that the loose particles are separated from each card subsequent to encoding the magnetic strip on each card and prior to placing the graphic design on each card; and (e) collecting each card after each card has been processed by steps (a) through (d).

18. The method of claim 17 further comprising the step of embossing alphanumeric characters on each card after said design placing step.

* * * * *

UNITED STATES PATENT AND TRADEMARK OFFICE
CERTIFICATE OF CORRECTION

PATENT NO. : 5,588,763

DATED : Dec. 31, 1996

INVENTOR(S) : Nubson et al.

It is certified that error appears in the above-identified patent and that said Letters Patent is hereby corrected as shown below:

On the cover page, in [62], Related Data, "Feb. 17, 1993" should read --Jan. 17, 1993--.

In column 1, line 42, "printer" should read --printers--.

In column 7, line 8, insert --,-- after the numeral "135"; line 9, delete "136" after the word "pair".

In column 10, line 1, "adjustment studs" should read --jackscrews--; line 62, "herewith" should read --therewith--; line 63, "o" should read "to".

In column 11, line 4, "300" should read --308--; line 34, "$P^{10}$" should read --$P_{10}$--.

In column 12, line 17, "68" should read --62--; line 17, insert --other-- after the word "each".

In column 14, line 31, "let" should read --left--.

In column 15, line 35, "he" should read --the--.

UNITED STATES PATENT AND TRADEMARK OFFICE
CERTIFICATE OF CORRECTION

PATENT NO. : 5,588,763

DATED : Dec. 31, 1997

INVENTOR(S) : Nubson et al.

It is certified that error appears in the above-identified patent and that said Letters Patent is hereby corrected as shown below:

In column 17, line 19, "518" should read --514--; line 50, "miss" should read --raises.

In column 22, line 21, claim 16, "leas" should read --least--.

Signed and Sealed this

Ninth Day of December, 1997

BRUCE LEHMAN

*Attest:*

*Attesting Officer*  Commissioner of Patents and Trademarks